United States Patent
Abraham et al.

(10) Patent No.: US 11,039,372 B2
(45) Date of Patent: *Jun. 15, 2021

(54) NON-ACCESS STRATUM TRANSPORT FOR NON-MOBILITY MANAGEMENT MESSAGES

(71) Applicant: QUALCOMM Incorporated, San Diego, CA (US)

(72) Inventors: Santosh Paul Abraham, San Diego, CA (US); Miguel Griot, La Jolla, CA (US); Haris Zisimopoulos, London (GB); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,375

(22) Filed: Apr. 10, 2020

(65) Prior Publication Data

US 2020/0245222 A1    Jul. 30, 2020

Related U.S. Application Data

(63) Continuation of application No. 15/860,544, filed on Jan. 2, 2018, now Pat. No. 10,624,020.
(Continued)

(51) Int. Cl.
*H04W 68/00* (2009.01)
*H04W 40/24* (2009.01)
(Continued)

(52) U.S. Cl.
CPC ....... *H04W 40/248* (2013.01); *H04L 63/0457* (2013.01); *H04L 63/06* (2013.01);
(Continued)

(58) Field of Classification Search
None
See application file for complete search history.

(56) References Cited

U.S. PATENT DOCUMENTS 10,624,020 B2    4/2020  Abraham et al.
2009/0262703 A1  10/2009  Khetawat et al.
(Continued)

OTHER PUBLICATIONS

3rd Generation Partnership Project; Technical Specification Group Services and System Aspects; Study on Architecture for Next Generation System (Release 14), 3GPP Standard; 3GPP TR 23.799, 3rd Generation Partnership Project (3GPP), Mobile Competence Centre; 650, Route Des Lucioles; F-06921 Sophia-Antipolis Cedex; France, vol. SA WG2, No. V14.0.0, Dec. 16, 2016, pp. 1-522, XP051230010, [retrieved on Dec. 16, 2016].
(Continued)

*Primary Examiner* — Sithu Ko
*Assistant Examiner* — Emmanuel K Maglo

(57) ABSTRACT

Methods, systems, and devices for wireless communication are described. A wireless communications system may support techniques for efficient communication between a user equipment (UE) and different entities (or functions) of a core network. Specifically, the UE may interact with a single entity (or function) of a core network (e.g., an access and mobility management function (AMF)), and messages intended for other entities (or functions) may be routed appropriately by this entity. For example, an AMF may receive a message from a UE intended for another entity (or function) of the core network, and the AMF may transmit (or route) the message to the entity (or function). Similarly, the AMF may receive a message from another entity (or function) of the core network, and the AMF may transmit (or route) the message to the UE.

13 Claims, 19 Drawing Sheets

Related U.S. Application Data

(60) Provisional application No. 62/455,451, filed on Feb. 6, 2017.

(51) Int. Cl.

| | | |
|---|---|---|
| *H04W 40/02* | (2009.01) | |
| *H04L 29/06* | (2006.01) | |
| *H04W 12/04* | (2021.01) | |
| *H04W 68/02* | (2009.01) | |
| *H04W 88/18* | (2009.01) | |
| *H04W 40/00* | (2009.01) | |
| *H04W 12/03* | (2021.01) | |
| *H04W 88/02* | (2009.01) | |
| *H04W 80/02* | (2009.01) | |
| *H04W 76/27* | (2018.01) | |

(52) U.S. Cl.
CPC ........... *H04W 12/03* (2021.01); *H04W 12/04* (2013.01); *H04W 40/00* (2013.01); *H04W 40/02* (2013.01); *H04W 68/02* (2013.01); *H04W 88/182* (2013.01); *H04W 68/00* (2013.01); *H04W 76/27* (2018.02); *H04W 80/02* (2013.01); *H04W 88/02* (2013.01)

(56) References Cited

U.S. PATENT DOCUMENTS

| | | | |
|---|---|---|---|
| 2010/0120455 | A1 | 5/2010 | Aghili et al. |
| 2011/0211505 | A1 | 9/2011 | Ping |
| 2011/0216743 | A1* | 9/2011 | Bachmann ............ H04L 63/164 370/331 |
| 2013/0083726 | A1 | 4/2013 | Jain et al. |
| 2014/0242970 | A1 | 8/2014 | Yu et al. |
| 2015/0103739 | A1 | 4/2015 | Ni et al. |
| 2016/0285627 | A1 | 9/2016 | Sedlacek et al. |
| 2017/0142587 | A1 | 5/2017 | Lee et al. |
| 2017/0150332 | A1 | 5/2017 | Palanisamy et al. |
| 2017/0257843 | A1* | 9/2017 | Wang ..................... H04W 4/70 |
| 2017/0303259 | A1 | 10/2017 | Lee et al. |
| 2017/0332421 | A1 | 11/2017 | Sternberg et al. |
| 2017/0339609 | A1 | 11/2017 | Youn et al. |
| 2018/0220332 | A1* | 8/2018 | Yamada ................ H04W 88/18 |
| 2018/0270840 | A1 | 9/2018 | Griot et al. |
| 2018/0317086 | A1* | 11/2018 | Ben Henda ......... H04L 63/0892 |
| 2019/0116631 | A1* | 4/2019 | Talebi Fard .......... H04W 68/02 |
| 2019/0364420 | A1* | 11/2019 | Rommer ................ H04L 67/14 |

OTHER PUBLICATIONS

Huawei, et al., "Comparison of the Options for Session ID Allocation and Routing of Subsequent SM Signalling", SA WG2 Meeting #118, S2-167000, Nov. 14-18, 2016, Reno, Nevada, USA, pp. 1-9.

Nokia, et al., "Interim Agreement on Routing of NAS Signalling and on How the AMF can Select the Proper SMF Instance for a PDU Session", SA WG2 Meeting #118, S2-166351, Nov. 14-18, 2016, Reno, NV, USA, pp. 1-5.

Nokia, et al., "Updates to Agreement on Policy Framework", SA WG2 Meeting #118, S2-166587, Nov. 14-18, Reno, Nevada, USA, pp. 1-2.

3rd Generation Partnership Project; Technical Specification Group Services and System Aspects; Study on Architecture for Next Generation System (Release 14), 3GPP Standard; 3GPP TR 23.99, 3rd Generation Partnership Project (3GPP), Mobile Competence Centre; 650, Route Des Lucioles; F-06921 Sophia-Antipolis Cedex; France, vol. SA WG2, No. V14.0.0, Dec. 16, 2016, pp. 1-522, XP051230010, [retrieved on Dec. 16, 2016].

3GPP TS 24.301 "3rd Generation Partnership Project; Technical Specification Group Core Network and Terminals; Non-Access-Stratum (NAS) protocol for Evolved Packet System (EPS); Stage 3 (Release 9)", Version 9.3.0, Jun. 15, 2010, Section 5.6.4 (p. 129), Sections 8.2.31 & 8.2.32 (pp. 200-201).

International Search Report and Written Opinion—PCT/US2018/012234—ISA/EPO—dated Mar. 7, 2018.

Qualcomm Inc: "Architecture Option 6 Updates: Delta on Impacts for the Support of e2e User Plane Security", 3GPP Draft; S2-166547_NEXTGEN_ARC_OPT_SECFUNCTALLOCATION_V4, 3rd Generation-Partnership Project (3GPP), Mobile Competence Centre; 650, Route Des Lucioles; F-06921 Sophia-Antipolis Cedex; France, vol. SA WG2, No. Reno, Nevada, USA, Nov. 14, 2016 (Nov. 14, 2016), pp. 1-10, XP051185106, Retrieved from the Internet: URL: http://www.3gpp.org/ftp/Meetings_3GPP_SYNC/SA2/Docs/ [retrieved on Nov. 14, 2016] the whole document.

Qualcomm Incorporated: "SMS Over 5G NAS", 3GPP Draft; S2-170225_PCR_SMS_OVER_NAS_V3, 3rd Generation Partnership Project (3GPP), Mobile Competence Centre; 650, Route Des Lucioles; F-06921 Sophia-Antipolis Cedex; France, vol. SA WG2, No. Spokane, US; Jan. 16, 2017-Jan. 20, 2017, Jan. 16, 2017 (Jan. 16, 2017), pp. 1-5, XP051216414, Retrieved from the Internet: URL: http://www.3gpp.org/ftp/Meetings_3GPP_SYNC/SA2/Docs/ [retrieved on Jan. 16, 2017].

Samsung, et al., "Interaction Between AMF and SMF", 3GPP Draft; S2-170611_WAS_0561_WAS_0263_AMF SMF Interaction_R4, 3rd Generation Partnership Project (3GPP), Mobile Competence Centre; 650, Route Des Lucioles; F-06921 Sophia-Antipolis Cedex; France, vol. SA WG2, No. Spokane, WA, USA; Jan. 16, 2017-Jan. 20, 2017, Jan. 23, 2017 (Jan. 23, 2017), pp. 1-3, XP051227883, Retrieved from the Internet: URL: http://www.3gpp.org/ftp/tsg_sa/WG2_Arch/TSGS2_118BIS_Spokane/Docs/ [retrieved on Jan. 23, 2017] the whole document.

International Preliminary Report on Patentability—PCT/US2018/012234, The International Bureau of WIPO—Geneva, Switzerland, dated Apr. 10, 2019.

* cited by examiner

NON-ACCESS STRATUM TRANSPORT FOR NON-MOBILITY MANAGEMENT MESSAGES

CROSS REFERENCES

The present application is a continuation of U.S. patent application Ser. No. 15/860,544, entitled "Non-Access Stratum Transport For Non-Mobility Management Messages," filed Jan. 2, 2018, which claims priority to U.S. Provisional Patent Application No. 62/455,451 by Abraham et al., entitled "Non-Access Stratum Transport For Non-Mobility Management Messages," filed Feb. 6, 2017, each of which assigned to the assignee hereof, and each of which is hereby expressly incorporated by reference herein in its entirety.

INTRODUCTION

The following relates generally to wireless communication and more specifically to non-access stratum (NAS) transport for non-mobility management messages.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems (e.g., NR systems) may include a core network in communication with a UE. In some examples, the core network may provide various services for a UE connected to the core network, which may include the UE being connected to a base station. Specifically, the core network may support mobility management services, session management services, and other operations associated with a UE. In some cases, the functions or entities providing these different services may be virtualized to allow for a more flexible architecture. As a result, some existing communication techniques (e.g., in LTE systems) that require an active data session may not be appropriate for a virtualized design.

SUMMARY

A method of wireless communication is described. The method may include identifying a payload for a transmission to a first core network entity, generating a NAS transport message based at least in part on a type of the payload, the NAS transport message comprising the payload, and transmitting the NAS transport message to a second core network entity.

An apparatus for wireless communication is described. The apparatus may include means for identifying a payload for a transmission to a first core network entity, means for generating a NAS transport message based at least in part on a type of the payload, the NAS transport message comprising the payload, and means for transmitting the NAS transport message to a second core network entity.

Another apparatus for wireless communication is described. The apparatus may include a processor, memory in electronic communication with the processor, and instructions stored in the memory. The instructions may be operable to cause the processor to identify a payload for a transmission to a first core network entity, generate a NAS transport message based at least in part on a type of the payload, the NAS transport message comprising the payload, and transmit the NAS transport message to a second core network entity.

A non-transitory computer readable medium for wireless communication is described. The non-transitory computer-readable medium may include instructions operable to cause a processor to identify a payload for a transmission to a first core network entity, generate a NAS transport message based at least in part on a type of the payload, the NAS transport message comprising the payload, and transmit the NAS transport message to a second core network entity.

Some examples of the method, apparatus, and non-transitory computer-readable medium described above may further include processes, features, means, or instructions for ciphering the payload based at least in part on a security key associated with the NAS transport message. In some examples of the method, apparatus, and non-transitory computer-readable medium described above, the NAS transport message comprises a header that indicates the type of the payload, a security key, routing information associated with a core network entity destination, or a combination thereof. In some examples of the method, apparatus, and non-transitory computer-readable medium described above, the NAS transport message comprises routing information (e.g., a routing indicator) that identifies the first core network entity to route the payload to. In some cases, the routing information may identify a protocol data unit (PDU) session.

In some examples of the method, apparatus, and non-transitory computer-readable medium described above, the payload comprises a session management (SM) payload, a short message service (SMS) payload, a policy control payload, or a combination thereof. In some examples of the method, apparatus, and non-transitory computer-readable medium described above, the NAS transport message comprises a mobility management (MM) message. In some examples of the method, apparatus, and non-transitory computer-readable medium described above, the NAS transport message comprises a NAS message and a container message comprising the payload.

In some examples of the method, apparatus, and non-transitory computer-readable medium described above, the first core network entity comprises a session management manager, a short message service manager, a policy control manager, or a combination thereof. In some examples of the method, apparatus, and non-transitory computer-readable medium described above, the second core network entity comprises an access and mobility management manager. In some examples of the method, apparatus, and non-transitory computer-readable medium described above, the UE may be in a connected mode with the first core network entity without an active data connection with the UE, wherein transmitting the NAS transport message to the second core network entity comprises transmitting the NAS transport message to the second core network entity on an active data connection with the second code network entity.

A method of wireless communication is described. The method may include receiving a NAS transport message comprising a payload from a UE, identifying a type of the payload in the NAS transport message received from the UE, and initiating an action by the first core network entity based at least in part on identifying the type of the payload.

An apparatus for wireless communication is described. The apparatus may include means for receiving a NAS transport message comprising a payload from a UE, means for identifying a type of the payload in the NAS transport message received from the UE, and means for initiating an action by the first core network entity based at least in part on identifying the type of the payload.

Another apparatus for wireless communication is described. The apparatus may include a processor, memory in electronic communication with the processor, and instructions stored in the memory. The instructions may be operable to cause the processor to receive a NAS transport message comprising a payload from a UE, identify a type of the payload in the NAS transport message received from the UE, and initiate an action by the first core network entity based at least in part on identifying the type of the payload.

A non-transitory computer readable medium for wireless communication is described. The non-transitory computer-readable medium may include instructions operable to cause a processor to receive a NAS transport message comprising a payload from a UE, identify a type of the payload in the NAS transport message received from the UE, and initiate an action by the first core network entity based at least in part on identifying the type of the payload.

Some examples of the method, apparatus, and non-transitory computer-readable medium described above may further include processes, features, means, or instructions for deciphering the payload based at least in part on a security key associated with the NAS transport message. In some examples of the method, apparatus, and non-transitory computer-readable medium described above, initiating an action by the first core network entity includes transmitting content of the NAS transport message to a second core network entity based at least in part on the type of the payload.

In some examples of the method, apparatus, and non-transitory computer-readable medium described above, initiating an action by the first core network entity includes deciphering a first portion of the NAS transport message based at least in part on a security key associated with the NAS transport message. Some examples of the method, apparatus, and non-transitory computer-readable medium described above may further include processes, features, means, or instructions for transmitting a second portion of the NAS transport message to a second core network entity based at least in part on the type of the payload.

In some examples of the method, apparatus, and non-transitory computer-readable medium described above, the NAS transport message comprises a header that indicates the type of the payload, a security key, routing information associated with a core network entity destination, or a combination thereof. In some examples of the method, apparatus, and non-transitory computer-readable medium described above, the NAS transport message comprises routing information (e.g., a routing indicator) that identifies a second core network entity to route the payload to. In some cases, the routing information may identify a PDU session. In some examples of the method, apparatus, and non-transitory computer-readable medium described above, initiating an action by the first core network entity includes transmitting content of the NAS transport message to the second core network entity based at least in part on the routing information.

In some examples of the method, apparatus, and non-transitory computer-readable medium described above, the second core network entity comprises a session management manager, a short message service manager, a policy control manager. In some examples of the method, apparatus, and non-transitory computer-readable medium described above, the payload comprises an SM payload, an SMS payload, a policy control payload, or a combination thereof. In some examples of the method, apparatus, and non-transitory computer-readable medium described above, the NAS transport message comprises a MM message. In some examples of the method, apparatus, and non-transitory computer-readable medium described above, the NAS transport message includes a NAS message and a container message comprising the payload.

Some examples of the method, apparatus, and non-transitory computer-readable medium described above may further include processes, features, means, or instructions for determining that the received NAS transport message may be an initial NAS transport message received from the UE. Some examples of the method, apparatus, and non-transitory computer-readable medium described above may further include processes, features, means, or instructions for transmitting a message to the UE acknowledging receipt of the NAS transport message. In some examples of the method, apparatus, and non-transitory computer-readable medium described above, the first core network entity comprises an access and mobility management manager.

A method of wireless communication is described. The method may include receiving a message comprising a payload from a second core network entity, generating a NAS transport message based at least in part on a type of the payload, the NAS transport message comprising the payload, and transmitting the NAS transport message to a UE.

An apparatus for wireless communication is described. The apparatus may include means for receiving a message comprising a payload from a second core network entity, means for generating a NAS transport message based at least in part on a type of the payload, the NAS transport message comprising the payload, and means for transmitting the NAS transport message to a UE.

Another apparatus for wireless communication is described. The apparatus may include a processor, memory in electronic communication with the processor, and instructions stored in the memory. The instructions may be operable to cause the processor to receive a message comprising a payload from a second core network entity, generate a NAS transport message based at least in part on a type of the payload, the NAS transport message comprising the payload, and transmit the NAS transport message to a UE.

A non-transitory computer readable medium for wireless communication is described. The non-transitory computer-readable medium may include instructions operable to cause a processor to receive a message comprising a payload from a second core network entity, generate a NAS transport message based at least in part on a type of the payload, the NAS transport message comprising the payload, and transmit the NAS transport message to a UE.

Some examples of the method, apparatus, and non-transitory computer-readable medium described above may further include processes, features, means, or instructions for ciphering the payload based at least in part on a security key associated with the NAS transport message. Some examples of the method, apparatus, and non-transitory computer-readable medium described above may further include processes, features, means, or instructions for determining that the UE may be in a connected mode, where transmitting the NAS transport message to the UE may be based at least in part on the determination.

Some examples of the method, apparatus, and non-transitory computer-readable medium described above may further include processes, features, means, or instructions for determining that the UE may be in an idle mode. Some examples of the method, apparatus, and non-transitory computer-readable medium described above may further include processes, features, means, or instructions for transmitting a paging message to the UE triggering a transition of the UE to a connected mode. Some examples of the method, apparatus, and non-transitory computer-readable medium described above may further include processes, features, means, or instructions for transmitting the NAS transport message to the UE based at least in part on a response from the UE to the paging message.

Some examples of the method, apparatus, and non-transitory computer-readable medium described above may further include processes, features, means, or instructions for identifying a transition of the UE from an idle mode to a connected mode. Some examples of the method, apparatus, and non-transitory computer-readable medium described above may further include processes, features, means, or instructions for transmitting, to the second core network entity, an indication that the UE may be in the connected mode. Some examples of the method, apparatus, and non-transitory computer-readable medium described above may further include processes, features, means, or instructions for receiving the message comprising the payload from the second core network entity based at least in part on the indication.

In some examples of the method, apparatus, and non-transitory computer-readable medium described above, the NAS transport message comprises a header that indicates the type of the payload, a security key, routing information associated with a core network entity destination, or a combination thereof. In some examples of the method, apparatus, and non-transitory computer-readable medium described above, the payload comprises a SM payload, a SMS payload, a policy control entity payload, or a combination thereof. In some examples of the method, apparatus, and non-transitory computer-readable medium described above, the NAS transport message comprises an MM message. In some examples of the method, apparatus, and non-transitory computer-readable medium described above, the NAS transport message comprises a NAS message and a container message comprising the payload.

In some examples of the method, apparatus, and non-transitory computer-readable medium described above, the first core network entity comprises an access and mobility management manager. In some examples of the method, apparatus, and non-transitory computer-readable medium described above, the second core network entity comprises a session management manager, a short message service manager, a policy control manager, or a combination thereof.

DETAILED DESCRIPTION

A wireless communications system (e.g., a 5G or a NR system) may include a core network in communication with a base station and/or a UE. The functions of the core network may be virtualized to allow for a more flexible architecture. Specifically, a core network may include several entities (e.g., functions) such as access and mobility management functions (AMFs), session management functions (SMFs), and others, that may be virtually implemented in software. In addition, in the wireless communications system (e.g., a 5G or a NR system), a UE may be in a connected mode with an entity of the core network and/or a base station without an active data connection. Accordingly, the UE may not be able to communicate with some virtualized entities (or functions) of the core network, and this may result in reduced throughput in a wireless communications system.

Some wireless communications systems may support techniques for efficient communication between a UE and different entities (or functions) of a core network. Specifically, in some examples, the UE may interact with a single entity of a core network (e.g., an AMF), and any data transmitted between the UE and other network entities may pass through the AMF.

As an example, for uplink communication, a UE may identify a payload to transmit to a second entity (or function) of a core network, and the UE may accordingly generate a NAS transport message based a type of the payload, where the NAS transport message includes the payload. The UE may then transmit the NAS transport message to the first core network entity (e.g., the AMF) to be routed to the second core network entity via the AMF. The AMF may then transmit (or route) the message to the appropriate entity-directly or through another entity. That is, in some cases, such transport messages from a UE can be routed to a core network entity to which the UE is not actively connected, facilitating a variety of core network functions through, for example, an AMF.

Similarly, for downlink communication, an entity (or function) may transmit a payload to the AMF, and the AMF may relay the payload to the UE. Thus, the UE may be able to communicate with different virtualized entities (or functions) of the core network without an active data session with that particular entity, based on using messaging or protocols. The described techniques accordingly provide for a transport message design that supports, for example, both MM and SM functionality, as well as providing the capability to carry SMS messages and other services.

Aspects of the disclosure introduced above are described below in the context of wireless communications systems. Examples of processes and signaling exchanges that support NAS transport for non-mobility management messages are then described. Aspects of the disclosure are further illustrated by and described with reference to apparatus diagrams, system diagrams, and flowcharts that relate to NAS transport for non-mobility management messages.

Figure 1:
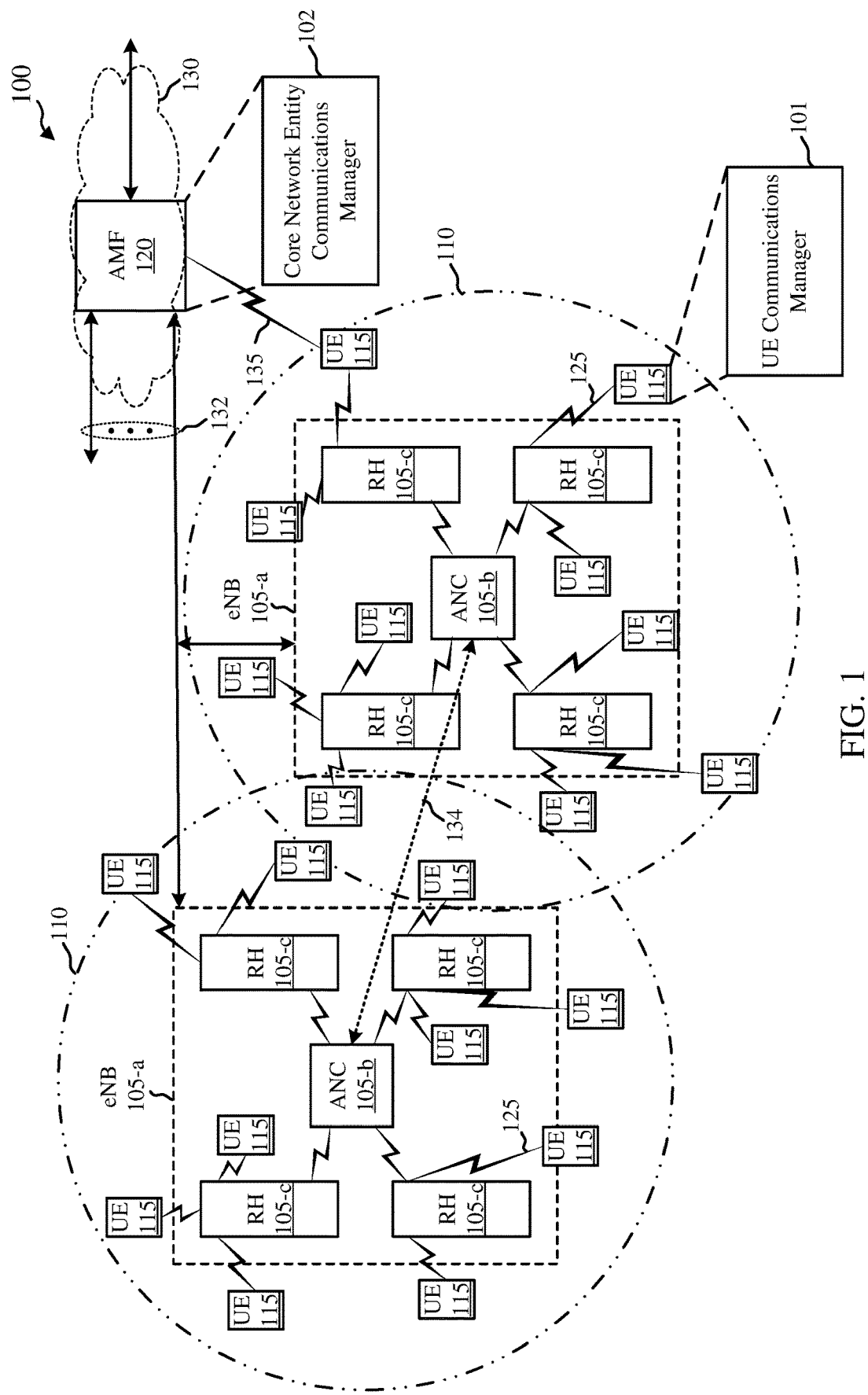
FIG. 1 illustrates an example of a wireless communications system that supports NAS transport for non-mobility management messages in accordance with one or more aspects of the present disclosure.

FIG. 1 illustrates an example of a wireless communications system 100 that supports NAS transport for non-mobility management messages in accordance with one or more aspects of the present disclosure. The wireless communications system 100 includes base stations 105 (e.g., gNodeBs (gNBs), and/or radio heads (RHs)), UEs 115, and core network 130. In some examples, the wireless communications system 100 may be an LTE (or LTE-Advanced) network, or an NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In wireless communications system 100, one base station 105 or a group of base stations 105 may be referred to as a radio access network (RAN) 105.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like. A UE 115 may be able to communicate with various types of base stations 105, network devices, access points, or other network devices, including macro eNBs, small cell eNBs, relay base stations, and the like. A UE 115 may communicate with the core network 130 through communication link 135.

UEs 115 may include a UE communications manager 101, which may identify a payload for a transmission to a first core network entity, generate a NAS transport message based at least in part on a type of the payload, where the NAS transport message includes the payload, and transmit the NAS transport message to a second core network entity. AMF 120 may include a core network entity communications manager 102, which may, in some cases, receive a NAS transport message including a payload from a UE, identify a type of the payload in the NAS transport message received from the UE, and initiate an action by the AMF 120 based at least in part on identifying the type of the payload. In other cases, AMF 120 may receive a message including a payload from a second core network entity, generate a NAS transport message based at least in part on a type of the payload, where the NAS transport message includes the payload, and transmit the NAS transport message to a UE.

Base stations 105 may communicate with the core network 130 and with one another. For example, base stations 105 (e.g., eNodeBs (eNBs), network access devices, gNBs) may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNBs, gNBs, and RHs.

The core network 130 may provide user authentication, access authorization, tracking, Internet Protocol (IP) connectivity, and other access, routing, or mobility functions. At least some of the network devices, such as base station 105-*a* may include subcomponents such as an access network entity 105-*b*, which may be an example of an access node controller (ANC). Each access network entity 105-*b* may communicate with a number of UEs 115 through a number of other access network entities 105-*c*, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

In some wireless communications systems (e.g., LTE systems), a base station 105 may be connected by an S1 interface to the core network 130. The core network may be an evolved packet core (EPC), which may include at least one mobility management entity (MME), at least one S-GW, and at least one P-GW. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

In wireless communications system 100 (e.g., a 5G system), the functions of the core network may be virtualized to allow for a more flexible architecture. Specifically, a core network may include several entities (or functions) such as AMFs, SMFs, etc. implemented in software. In addition, in the wireless communications system (e.g., 5G system), a UE may be in a connected mode with a base station without an active data connection. Accordingly, the UE may not be able to communicate with some virtualized entities (or functions), and this may result in reduced throughput in a wireless communications system.

Wireless communications system 100 may support techniques for efficient communication between a UE 115 and different entities (or functions) of a core network. Specifically, UE 115 may interact with a single entity (or function) of a core network (e.g., an AMF 120), and messages intended for other entities (or functions) may be routed appropriately by this entity. That is, as one example, for uplink communication, a UE may transmit a payload to AMF 120 intended for another entity of the core network, and AMF 120 may transmit (or route) the payload to the appropriate entity. Similarly, for downlink communication, other entities (or functions) may transmit a payload to AMF 120, and the AMF may transmit (or route) the payload to a UE 115.

Figure 2:
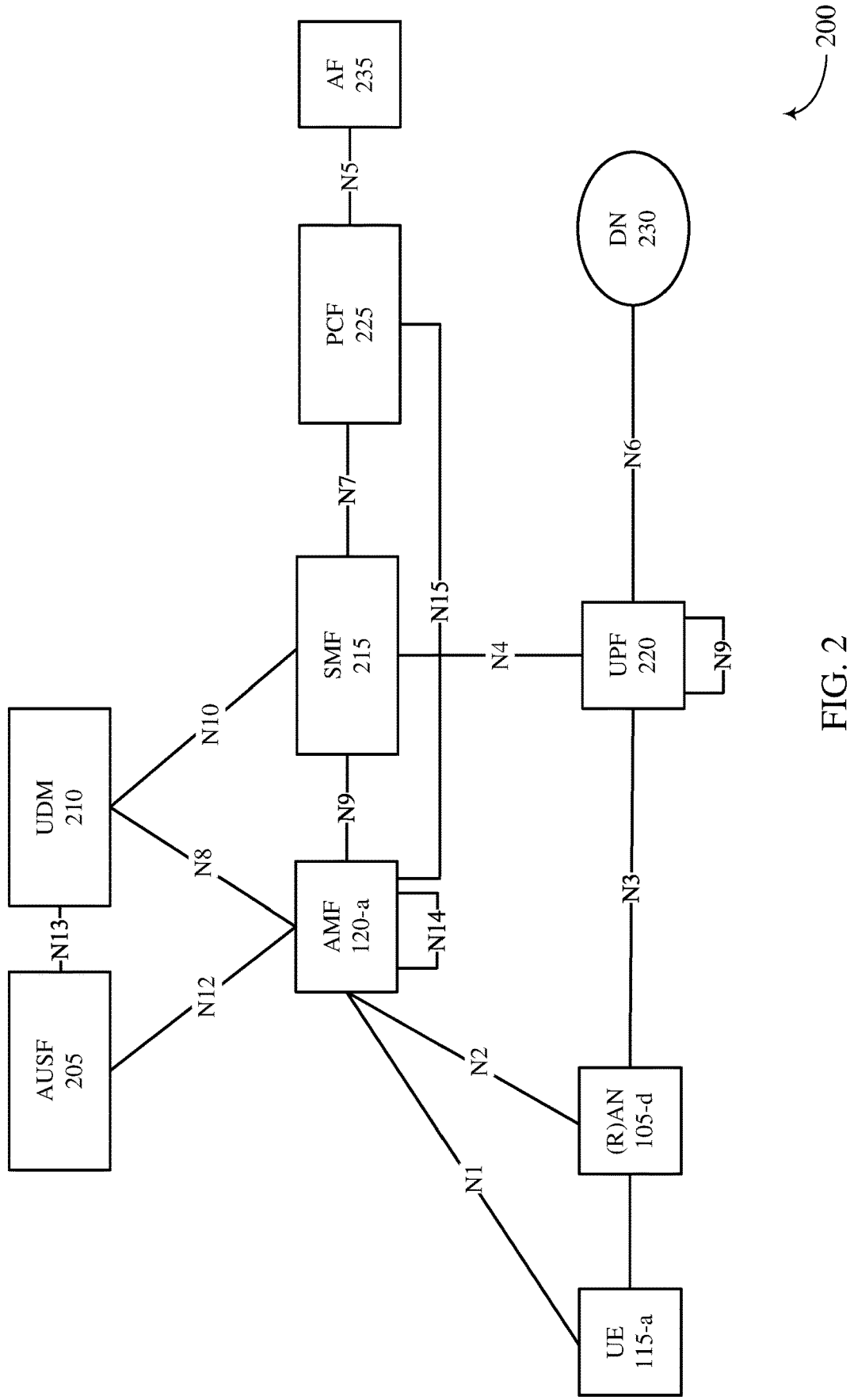
FIG. 2 illustrates an example of a wireless communications system architecture that supports NAS transport for non-mobility management messages in accordance with one or more aspects of the present disclosure.

FIG. 2 illustrates an example of a wireless communications system architecture 200 that supports NAS transport for non-mobility management messages in accordance with one or more aspects of the present disclosure. Wireless communications system architecture 200 may include UE 115-a, (R)AN 105-d, and AMF 120-a, which may be examples of the corresponding devices as described with reference to FIG. 1. Wireless communications system architecture 200 may also include one or more authentication server functions (AUSFs) 205, unified data management (UDM) entities 210, SMFs 215, user plane functions (UPFs) 220 (e.g., in communication with a data network (DN) 230), policy control functions (PCFs) 230, and authorization functions (AFs) 235. In addition, wireless communications system architecture 200 may include other functions or entities not displayed within the figure, or may not include one or more of the functions or entities shown.

AUSF 205 may provide authentication services for UE 115-a. For example, AUSF 205 may initiate authentication of UE 115-a and provide NAS security functions for UE 115-a based on a request from AMF 120-a over communication link N12. In some cases, the authentication and security function may be based on information stored in entity 210 (e.g., a UDM). Entity 210 (e.g., a UDM) may support an authentication credential repository and processing function (ARPF) that stores the long-term security credentials used in authentication. AUSF 205 may retrieve information from entity 210 (e.g., UDM) over communication link N13.

SMF 215 may provide session management services for UE 115-a. Specifically, SMF 215 may establish, modify, and release sessions (or bearers) for communication between UE 115-a and DN 230. For example, SMF 215 may maintain a tunnel for communication between UPF 220 and an access network (AN) node. In addition, SMF 215 may allocate and manage IP addresses for UE 115-a, select and control user plane functions, configure traffic steering at UPF 220 to route traffic to proper destinations, terminate SM parts of NAS messages, provide roaming functionality, etc.

UPF 220 may include functionality for serving as the point of interconnect to DN 230 for an external PDU session. In some cases, UPF 220 may be the anchor point for intra-RAT and inter-RAT mobility. UPF 220 may route and forward packets to and from DN 230, inspect packets and enforce policy rules in the user plane, report traffic usage, handle quality of service (QoS) for user plane packets, verify uplink traffic, etc. PCF 225 may support unified policy framework to govern the behavior of the network. Specifically, PCF 225 may provide policy rules to control plane functions to enforce them. In some cases, PCF 225 may retrieve subscription information from a subscription repository at entity 210 (e.g., a UDM). AF 235 may support services for authorizing UE 115-a for access to a network.

In some wireless systems (e.g., a 5G wireless system), UE 115-a may access DN 230 to exchange data packets using a PDU session. The PDU session may provide a PDU connectivity service, which may support the transmission of one or more PDUs between UE 115-a and DN 230. An association between UE 115-a and DN 230 in a PDU session may use internet protocol (IP) or Ethernet, or the association may be unstructured. In some cases, DN 230 may be an example of a local DN, central DN, public land mobile networks (PLMNs), etc.

As illustrated the different functions of a core network may be virtualized to support a more flexible architecture. That is, the different functions described above may be implemented in software. In such cases, UE 115-a may communicate with DN 230, SMF 215, PCF 225, etc. via the N3 communication link between RAN 105-d and UPF 220. The N3 communication link may be referred to as a data connection for UE 115-a. But in some cases, UE 115-a may not have information to transmit to any of these entities (or functions) or UE 115-a may have limited information to transmit, and it may be inefficient to sustain an active data connection. Accordingly, some wireless communications systems may allow a UE 115 to be in a connected mode without an active data connection. But without an active data connection, the UE may not be able to transmit the limited amounts of data, and this may result in reduced throughput in a wireless communications system.

Wireless communications system architecture 200 may support efficient techniques for allowing a UE 115 to communicate with entities (or functions) of a core network without an active data connection. Specifically, UE 115-a may transmit messages intended for other entities (or functions) to AMF 120, and such messages may be routed appropriately by this entity. For example, for SM messages, UE 115-a may transmit a NAS transport message to AMF 120, which may transmit (or route) the message to SMF 215 via the N9 communication link. The NAS transport message may include routing information (e.g., a routing indicator) and a header that indicates the type of payload included in the message, and AMF 120-*a* may use this information to route the message appropriately. Accordingly, UE 115-*a* may be able to transmit and receive information to and from entities (or functions) of a core network without having to maintain an active data session.

Figure 3:
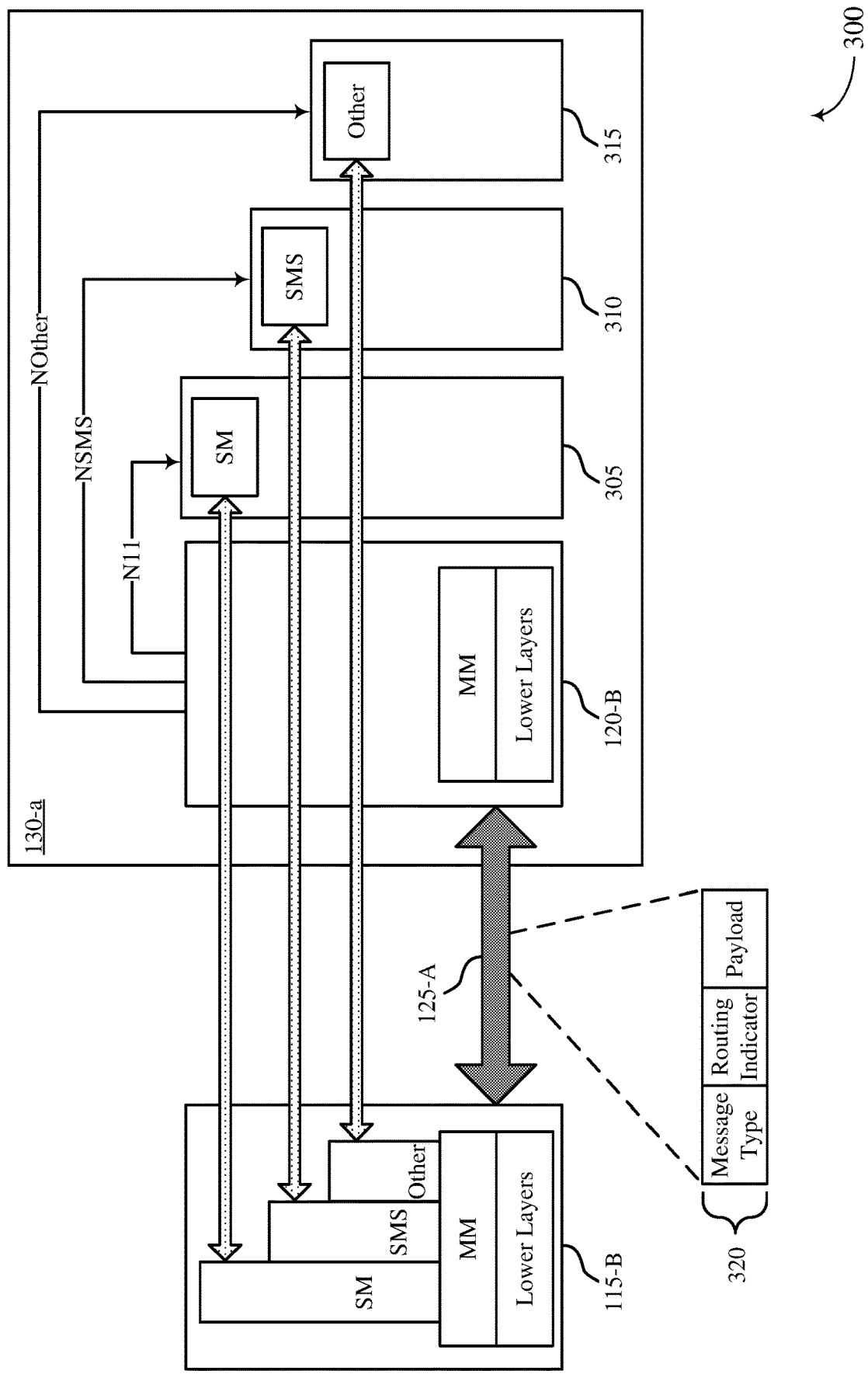
FIGS. 3-7 illustrate examples of protocol stacks in wireless communications systems that support NAS transport for non-mobility management messages in accordance with one or more aspects of the present disclosure.

FIG. 3 illustrates an example of a protocol stack 300 in a wireless communications system that supports NAS transport for non-mobility management messages in accordance with one or more aspects of the present disclosure. Protocol stack 300 may include UE 115-*b* and AMF 120-*b*, which may be examples of the corresponding devices as described with reference to FIGS. 1 and 2. Protocol stack 300 may also include SMS function (SMSF) 310 and other entities (or functions) 315 of a core network 130.

For uplink communication using NAS signaling, a UE may identify a payload to transmit to an entity (or function) of a core network (e.g., SMF 305), and UE 115-*a* may generate a NAS transport message 320 that includes the payload. In some cases, the NAS transport message 320 may be a message specifically designed for communication via AMF 120-*b*. In other cases, the NAS transport message may be a MM message that includes the payload, or a plain NAS message with a container message that includes the payload.

If MM messages are used, UE 115-*b* may be able to leverage the native security protection of such messages to provide security for the NAS transport message. But if plain NAS messages with container messages are used, it may be appropriate to design specific security protocols for such messages. In any case, NAS transport message 320 may include a message type field, routing information (e.g., a routing indicator), and the payload. Each of these fields (e.g., information elements) may be ciphered and integrity protected prior to transmission. Once the NAS transport message is generated, UE 115-*b* may transmit the message to AMF 120-*b* over communication link 125-*a*.

AMF 120-*a* may receive NAS transport message 320 and determine the core network entity (or function) to receive the payload based on the message type and routing indicator included in the message. In some examples, NAS transport message 320 may be intended for another entity (or function) of the core network, and AMF 120-*b* may transmit (or route) the message to the corresponding entity (or function). In other examples, NAS transport message 320 may be intended for AMF 120-*b*, and the message may be terminated at AMF 120-*b*. Further, the NAS transport message may include a first portion intended for AMF 120-*b* and a second portion intended for another entity (or function), and AMF 120-*b* may terminate the first portion and transmit (or route) the second portion to the appropriate entity (or function).

As an example, AMF 120-*b* may identify that NAS transport message 320 is intended for SMF 305, and AMF 120-*b* may transmit (or route) the payload to SMF 305 over the N11 interface. In other examples, AMF 120-*b* may identify that NAS transport message 320 is intended for SMSF 310, and AMF 120-*b* may transmit (or route) the payload to SMSF 310 over the network service and management system (NSMS) interface. As shown, the same techniques may apply for transmitting (or routing) messages to other functions (or entities 315) over the appropriate interface (e.g., NOther).

For downlink communication, messages for UE 115-*b* may also be routed through AMF 120-*b*. Specifically, other entities (or functions) (e.g., SMF 305) may transmit messages to AMF 120-*b* for transmission to UE 115-*b*. The messages transmitted to AMF 120-*b* may include an indication (e.g., a routing indicator) that specifies that UE 115-*b* is to receive the payload. AMF 120-*b* may then generate a NAS transport message that includes the payload for a transmission to UE 115-*b*. In some cases, before transmitting the NAS transport message, AMF 120-*b* may determine the connection status of UE 115-*b*. If UE 115-*b* is in a connected mode, AMF 120-*b* may transmit the NAS transport message 320 over communication link 125-*a* to UE 115-*b*.

If, however, UE 115-*b* is in an idle mode, AMF 120-*b* may not transmit (or route) the NAS transport message to UE 115-*b*. Instead, AMF 120-*b* may transmit a paging message to UE 115-*b* to trigger a transition of UE 115-*b* from an idle mode to a connected mode. AMF 120-*b* may then transmit the NAS transport message to UE 115-*b* based on a response from UE 115-*b* to the paging message. In other cases, a network entity (or function) may query AMF 120-*b* for a status of UE 115-*b*. If AMF 120-*b* indicates that the UE is in a connected mode, the network entity (or function) may transmit the message to AMF 120-*b*, which may then transmit (or route) the message to UE 115-*b*. If AMF 120-*b* indicates that the UE is in an idle mode, the network entity may refrain from transmitting the message to AMF 120-*b*, and AMF 120-*b* may store an indication that there is a message on hold for the UE. Once the UE transitions to a connected mode, AMF 120-*b* may transmit an indication of the transition to the network entity (or function). The network entity (or function) may then send the message to AMF 120-*b*, which may then transmit (or route) the message to UE 115-*b*.

Figure 4:
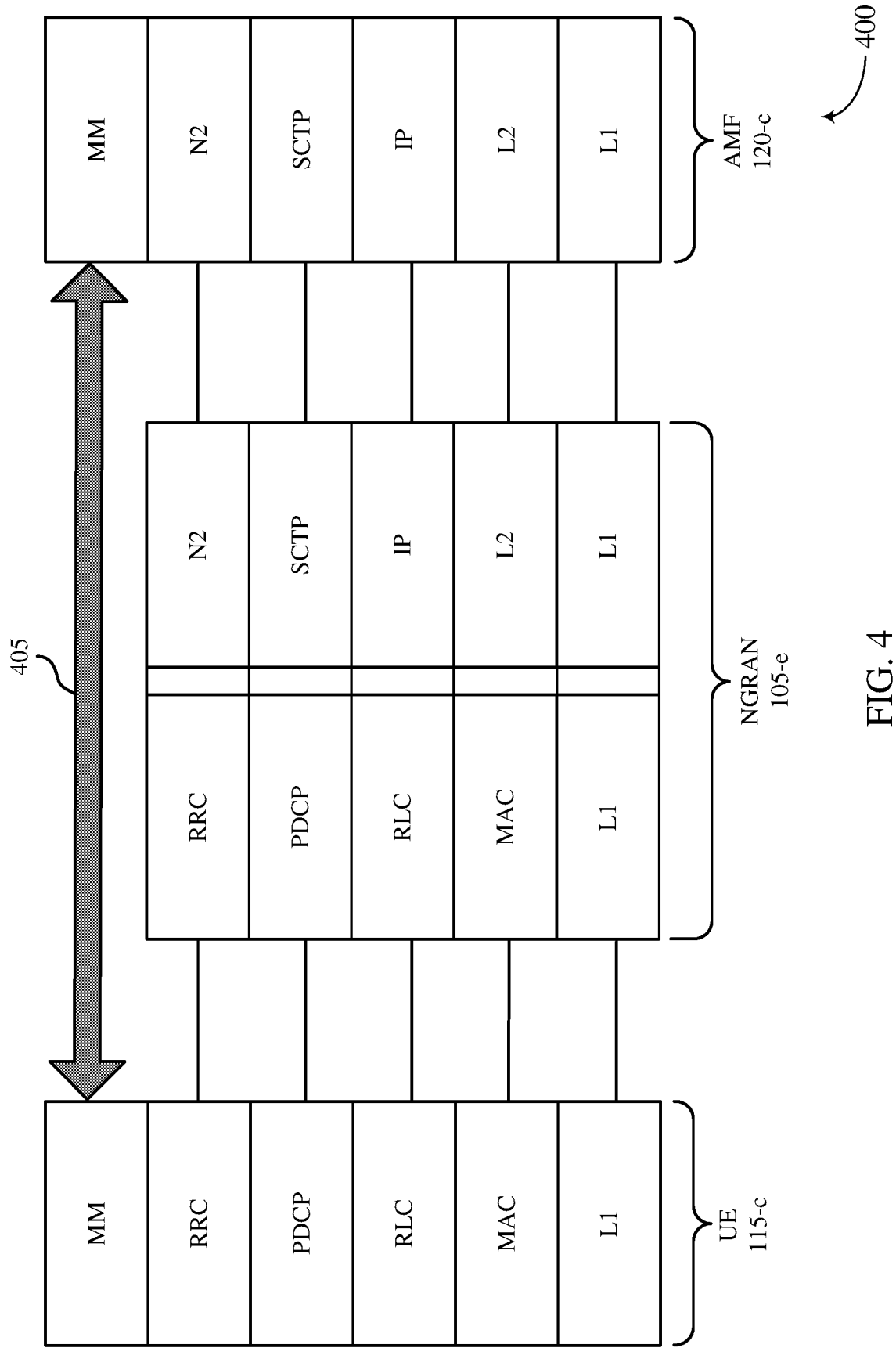

FIG. 4 illustrates an example of a protocol stack 400 in a wireless communications system that supports NAS transport for non-mobility management messages in accordance with one or more aspects of the present disclosure. Protocol stack 400 may represent protocols used for communication between UE 115-*c*, next generation RAN (NGRAN) 105-*e*, and AMF 120-*c*, which may be examples of the corresponding devices as described with reference to FIGS. 1-3. As illustrated, UE 115-*c* may communicate with AMF 120-*c* according to a MM protocol.

For uplink communication, UE 115-*c* may transmit an MM message to AMF 120-*c*. In some cases, the MM message may be terminated at AMF 120-*c*. In other cases, a payload included in the MM message may be intended for another network entity (or function). Accordingly, UE 115-*c* may include an indication in the header of the MM message that specifies the network entity (or function) to receive the MM message. For example, if the message is intended for an SMF, the UE may indicate in the header of the MM message that the message is an SM signaling message. AMF 120-*c* may then transmit (or route) the payload in the MM message to the appropriate core network entity based on the payload type. MM transport messages may be integrity protected, and payloads included in the message for other entities (or functions) may be ciphered according to MM security keys.

For downlink communication, a network entity (or function) may transmit a payload to AMF 120-*c* for a transmission to UE 115-*c*. The message to AMF 120-*c* may include an indication that the payload included in the message is intended for UE 115-*c*. AMF 120-*c* may then generate an MM message that includes the payload, and AMF 120-*c* may transmit the message to UE 115-*c*. The payload included in the MM message may be ciphered at AMF 120-*c* according to MM security keys, and deciphered at UE 115-*c* according to the same keys. In some cases, an MM transport message transmitted over communication link 405 may be transmitted as an initial NAS message for uplink or downlink communication.

Figure 5:
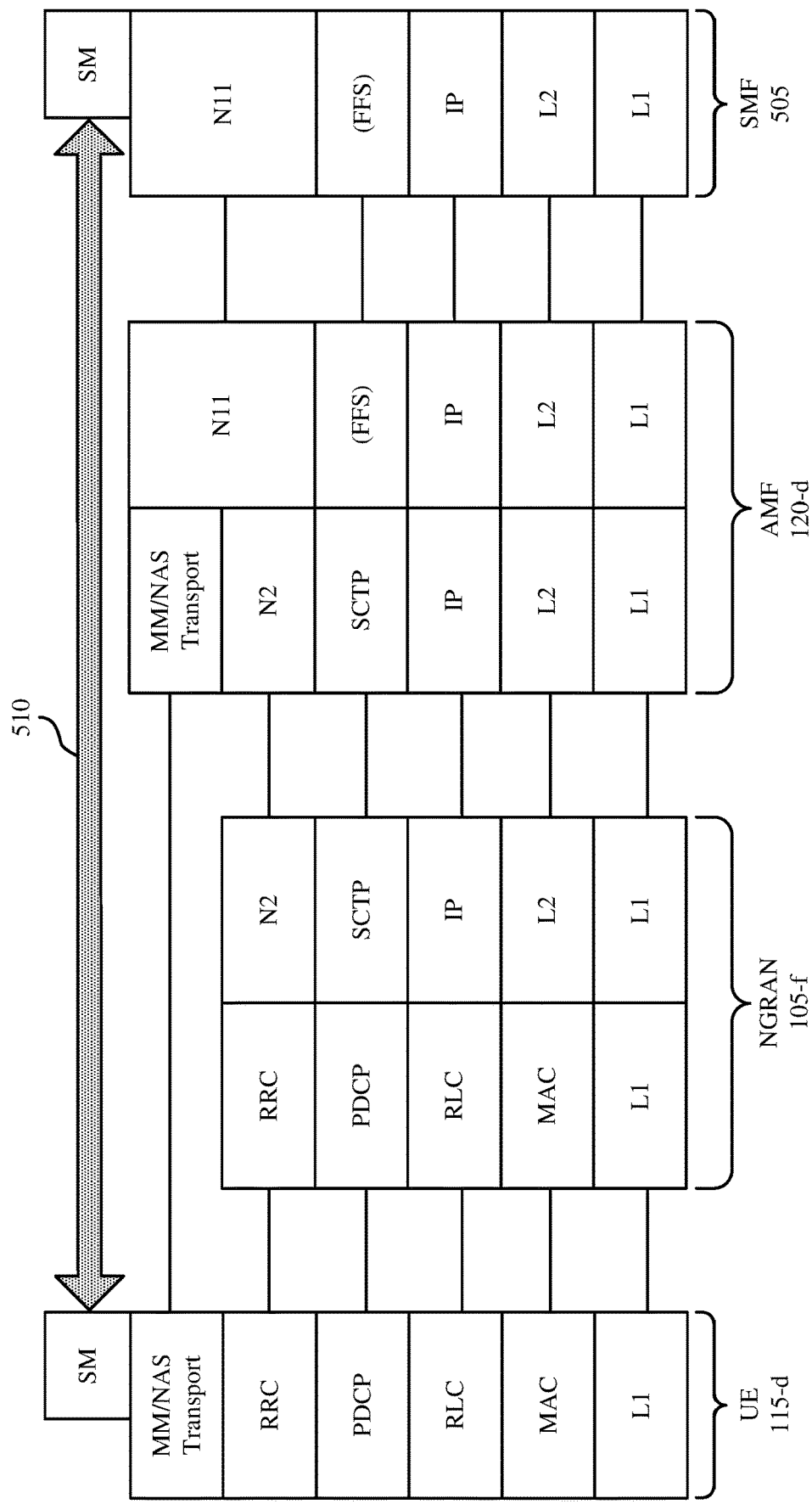

FIG. 5 illustrates an example of a protocol stack 500 in a wireless communications system that supports NAS transport for non-mobility management messages in accordance with one or more aspects of the present disclosure. Protocol stack 500 may represent protocols used for communication between UE 115-*d*, NGRAN 105-*f*, AMF 120-*d*, and SMF 505, which may be examples of the corresponding devices as described with reference to FIGS. 2 and 3. As illustrated, a UE 115-*d* may communicate with SMF 505 according to an SM protocol.

For uplink communication, UE 115-D may transmit a NAS transport message to AMF 120-*d* including an SM payload. The SM payload included in the NAS transport message may be intended for SMF 505. Accordingly, the NAS transport message to AMF 120-*d* may include an indication in the header that specifies that the payload is for SMF 505. AMF 120-*d* may then transmit (or route) the payload to SMF 505. NAS transport messages may be integrity protected, and payloads included in the message for SMF 505 may be ciphered according to security keys associated with the NAS transport message.

For downlink communication, SMF 505 may transmit a payload to AMF 120-*d* for a transmission to UE 115-*d*. The message to AMF 120-*d* may include an indication that the payload is intended for UE 115-*d*. AMF 120-*d* may then generate a NAS transport message that includes the payload, and AMF 120-*d* may transmit the message to UE 115-*d*. The payload included in the MM message may be ciphered according to security keys associated with the NAS transport message. In some cases, the NAS transport message transmitted over communication link 510 may be transmitted as an initial NAS message for uplink or downlink communication.

Figure 6:
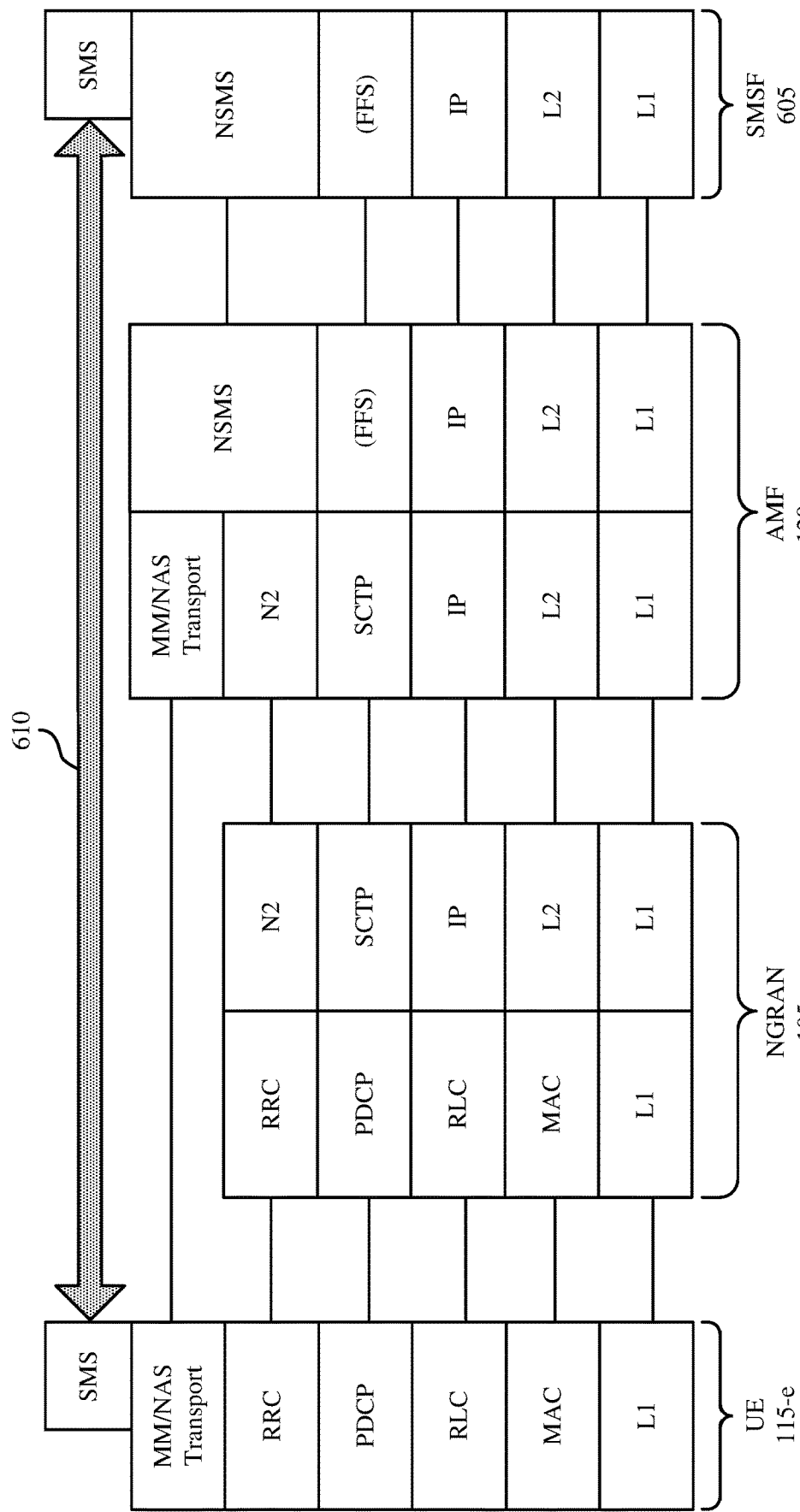

FIG. 6 illustrates an example of a protocol stack 600 in a wireless communications system that supports NAS transport for non-mobility management messages in accordance with one or more aspects of the present disclosure. Protocol stack 600 may represent protocols used for communication between UE 115-*e*, NGRAN 105-*g*, AMF 120-*e*, and SMSF 605, which may be examples of the corresponding devices as described with reference to FIGS. 2 and 3. As illustrated, UE 115-*e* may communicate with SMSF 605 according to an SMS protocol.

For uplink communication, UE 115-*e* may transmit a NAS transport message to AMF 120-*e* including an SMS payload. The SMS payload included in the NAS transport message may be intended for SMSF 605. Accordingly, the message to AMF 120-*e* may include an indication in the header that specifies that the payload is for SMSF 605. AMF 120-*e* may then transmit (or route) the payload to SMSF 605. NAS transport messages may be integrity protected, and payloads included in the message for SMSF 605 may be ciphered according to security keys associated with the NAS transport message.

For downlink communication, SMSF 605 may transmit a payload to AMF 120-*e* for a transmission to UE 115-*e*. The message to AMF 120-*e* may include an indication that the payload is intended for UE 115-*e*. AMF 120-*e* may then generate a NAS transport message that includes the payload, and AMF 120-*e* may transmit the message to UE 115-*e*. The payload included in the MM message may be ciphered according to security keys associated with the NAS transport message. In some cases, the NAS transport message transmitted over communication link 610 may be transmitted as an initial NAS message for uplink or downlink communication.

Figure 7:
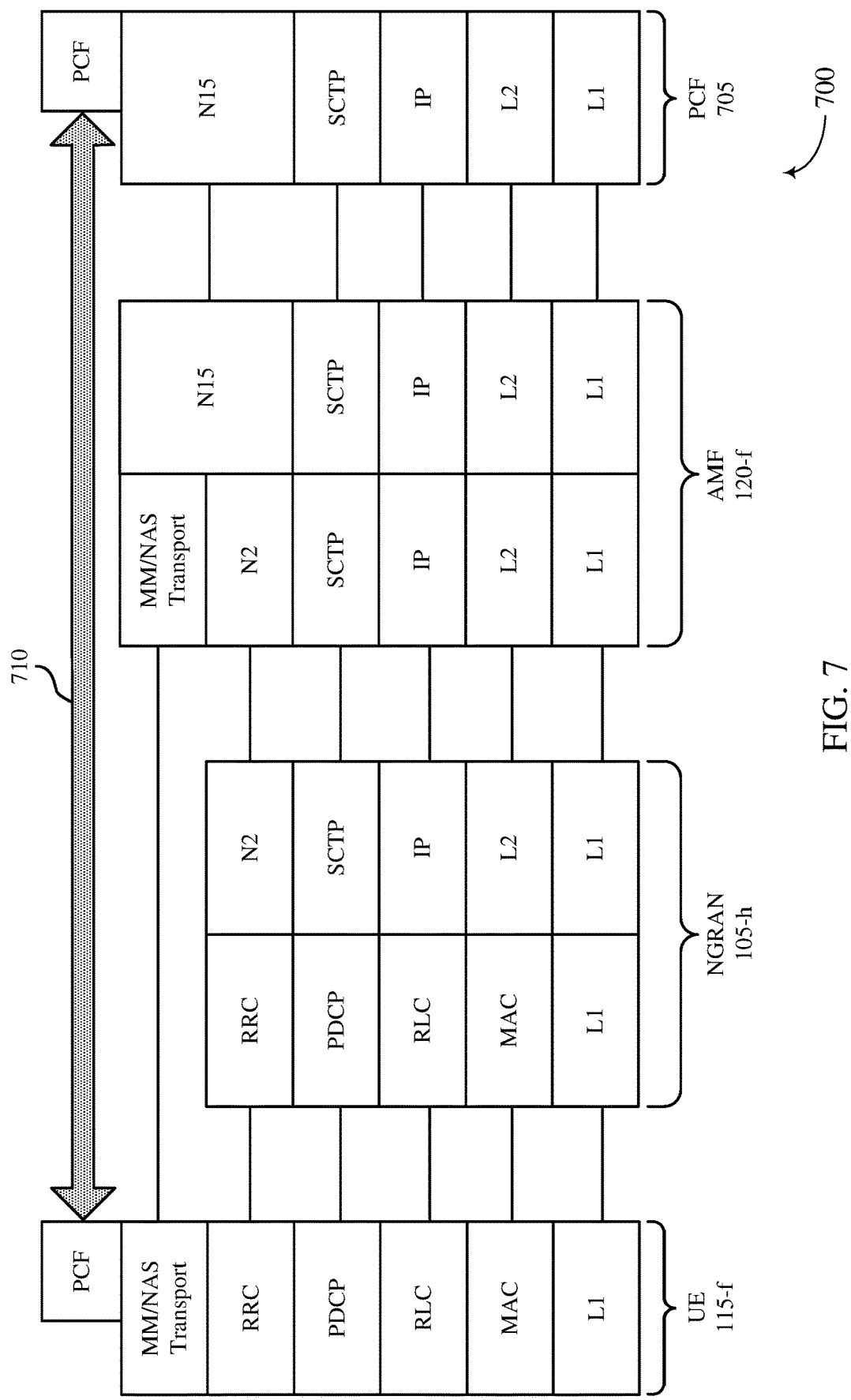

FIG. 7 illustrates an example of a protocol stack 700 in a wireless communications system that supports NAS transport for non-mobility management messages in accordance with one or more aspects of the present disclosure. Protocol stack 700 may represent protocols used for communication between UE 115-*f*, NGRAN 105-*h*, AMF 120-*f*, and PCF 705, which may be examples of the corresponding devices as described with reference to FIGS. 2 and 3. As illustrated, UE 115-*e* may communicate with PCF 705 according to an PCF protocol.

In some wireless communications systems (e.g., 5G systems), the network may provide policy information to UE 115-*f*. Such policy information may include access network discovery and selection policy (ANDSP), session and service continuity (SCC) mode selection policy (SSCMSP), and network slide selection policy (NSSP). ANDSP may be used by UE 115-*f* for selecting accesses and for deciding how to route traffic between the selected accesses and other accesses. SSCMSP may be used by UE 115-*f* to associate UE applications with SCC modes and to determine when a new PDU session should be requested with a new SCC mode. NSSP policy may be used by UE 115-*f* to associate UE applications with SM network slice selection assistance information (NSSAI) and to determine when a new PDU session should be requested with a new SM-NSSAI.

For ANDSP, since an access network discovery and selection function (ANDSF) may be shared by RANs of different radio access technologies (RATs), UE 115-*f* may access ANDSF via an IP user plane. Accordingly, UE 115-*f* may use a valid data session in order to access the ANDSF. For SSCMSP, there may be scenarios where the PDU sessions are used for non-IP traffic. In order to make IP user plane transport available to UE 115-*f*, the UE 115-*f* may establish an appropriate IP PDU session. But the establishment of an IP PDU session for PCF information retrieval for SSCMSP may be excessive. For NSSP, because UE 115-*f* may not have a network slice available, UE 115-*f* may not be able to set up a data session in order to obtain information about the NSSP. Accordingly, techniques for communicating using NAS signaling may be desirable when the UE 115-*f* is in a connected mode without an active data session.

For uplink communication, UE 115-*f* may transmit a NAS transport message to AMF 120-*f* including a PCF payload. The PCF payload included in the NAS transport message may be intended for PCF 705. Accordingly, the message to AMF 120-*f* may include an indication in the header that specifies that the payload is for PCF 705. AMF 120-*f* may then transmit (or route) the payload to PCF 705. NAS transport messages may be integrity protected, and payloads included in the message for PCF 705 may be ciphered according to security keys associated with the NAS transport message.

For downlink communication, PCF 705 may transmit a payload to AMF 120-*f* for a transmission to UE 115-*f*. The message to AMF 120-*f* may include an indication that the payload is intended for UE 115-*f*. AMF 120-*f* may then generate a NAS transport message that includes the payload, and AMF 120-*f* may transmit the message to UE 115-*f*. The payload included in the MM message may be ciphered according to security keys associated with the NAS transport message. In some cases, the NAS transport message transmitted over communication link 710 may be transmitted as an initial NAS message for uplink and downlink communication.

By using the techniques described herein, UE 115-f may communicate with PCF 705 without an active data connection. Thus, UE 115-f may be able to retrieve information pertaining to SSCMSP and NSSP over NAS.

Figure 8A:
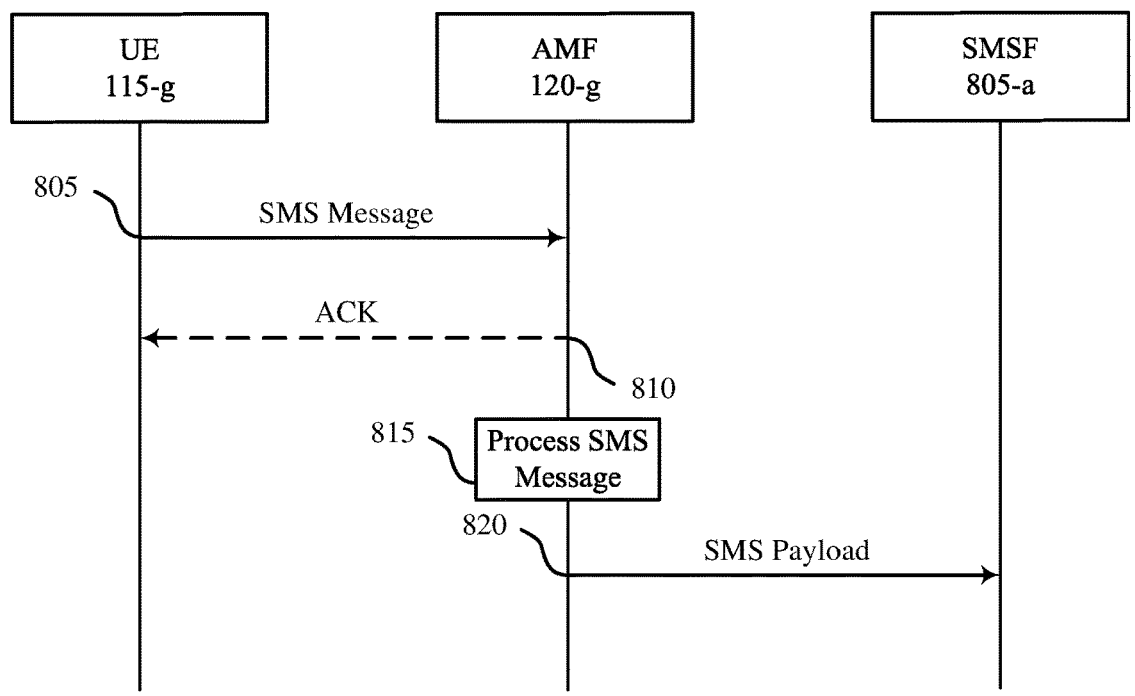
FIGS. 8A and 8B illustrate examples of process flows in wireless communications systems that support NAS transport for non-mobility management messages in accordance with one or more aspects of the present disclosure.

FIG. 8A illustrates an example of a process flow 800-a in a wireless communications system that supports NAS transport for non-mobility management messages in accordance with one or more aspects of the present disclosure. Process flow 800-a may include UE 115-g and AMF 120-g, which may be examples of the corresponding devices as described with reference to FIGS. 1-7. Process flow 800-a may also include SMSF 805-a which may be an example of an SMSF as described with reference to FIGS. 3 and 6.

At 805, UE 115-g may transmit an SMS message to AMF 120-g. In some cases, the SMS message may be a NAS transport message including an SMS payload. UE 115-g may identify the SMS payload for the transmission, and generate the NAS transport message based on the type of the payload (i.e., SMS payload). In some examples, UE 115-g may cipher the SMS payload based on a security key associated with the NAS transport message.

AMF 120-g may receive the SMS message, and, at 810, AMF 120-g may transmit a message to UE 115-g acknowledging receipt of the SMS message. In some cases, AMF 120-g may determine if the SMS message is an initial NAS transport message, and AMF 120-g may transmit the acknowledgement message at 810 based on the determination (i.e., if the SMS message is an initial NAS transport message). UE 115-g may be in a connected mode with AMF 120-g, but, in some examples, the UE may not have an active data connection. In some examples, UE 115-g may be in a connected mode with AMF 120-g via a base station.

At 815, AMF 120-g may process the SMS message received at 805. In some cases, AMF 120-g may identify a type of the payload (e.g., SMS payload) included in the SMS message. The SMS message (or NAS transport message) may include a header that indicates the type of the payload (i.e., SMS payload). The SMS message (or NAS transport message) may also include routing information (e.g., a routing indicator) that identifies a second core network entity (e.g., SMSF 805-a) to route the SMS payload to. In the present example, the payload may be an SMS payload. But in other examples, the payload may be an SM payload, a policy control payload, or a combination of payloads. The SMS message (or NAS transport message) may be an MM message, or may be a NAS message with a container message that includes the SMS payload.

At 820, AMF 120-g may initiate an action by the AMF 120-g based on identifying the type of the payload (e.g., SMS payload). In the present example, AMF 120-g transmit (e.g., route) an SMS payload included in the SMS message to SMSF 805-a (e.g., based on a routing information included in the SMS message). In other examples, AMF 120-g may decipher the SMS payload based on a security key associated with the SMS message (or NAS transport message), and terminate the message at AMF 120-g. In yet other examples, the NAS transport message may include a first portion for AMF 120-g and a second portion for SMSF 805-a. In such cases, AMF 120-g may decipher the first portion of the NAS transport message based on a security key associated with the NAS transport message, and transmit (or route) the second portion of the NAS transport message to SMSF (805-a) based on a type of the payload (e.g., SMS payload).

Although FIG. 8A describes the transmission of a message to SMSF 805-a, the above techniques apply to transmitting (or routing) NAS transport messages to an SM manager, a policy control manager, etc.

Figure 8B:
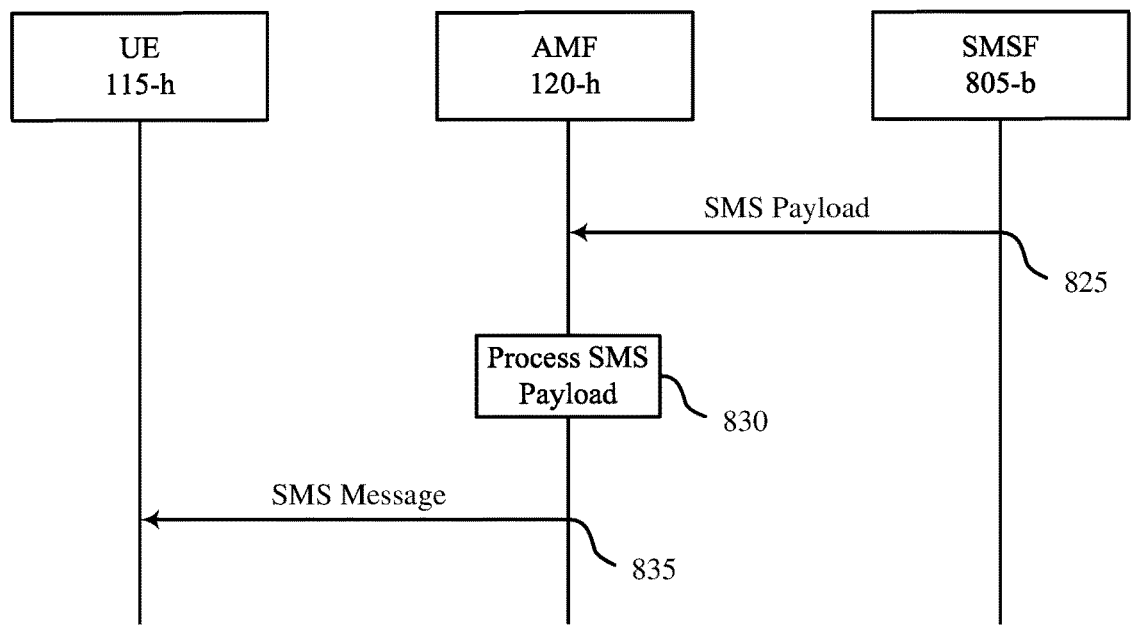

FIG. 8B illustrates an example of a process flow 800-b in a wireless communications system that supports NAS transport for non-mobility management messages in accordance with one or more aspects of the present disclosure. Process flow 800-b may include UE 115-h and AMF 120-h, which may be examples of the corresponding devices as described with reference to FIGS. 1-7. Process flow 800-n may also include SMSF 805-b which may be an example of an SMSF as described with reference to FIGS. 3 and 6.

At 825, AMF 120-h (e.g., a first core network entity) may receive an SMS payload from SMSF 805-b (e.g., a second core network entity). In the present example, the payload may be an SMS payload and the second core network entity may be SMSF 805-b. But in other examples, the payload may be an SM payload, a policy control payload, etc., and the second core network entity may be an SM manager, a policy control manager, etc.

At 830, AMF 120-h may process the SMS payload received at 825. Specifically, AMF 120-h may identify the type of payload and generate a NAS transport message that includes the payload based on the type of the payload. AMF 120-h may cipher the payload in the NAS transport message based on a security key associated with the NAS transport message. The NAS transport message may include a header that indicates the type of the payload. In some cases, the NAS transport message may be an MM message, and, in other cases, the NAS transport message may be a NAS message and a container message that includes the payload. In some cases, the header may also include routing information and a security key. In some cases, the header may include routing information based on the type of the payload. For example, routing information may identify a PDU session, for example, using a PDU session identifier (i.e., a PDU session ID). Additionally or alternatively, whether or not routing information is included in the payload may be based on the type of the payload. For example, routing information may be included in a payload based on the payload being of a first type. Alternatively, routing information may not be included in a payload based on the payload being of a second first type.

At 835, AMF 120-h may transmit an SMS message to UE 115-h. In some cases, AMF 120-h may determine the connection status of UE 115-h (e.g., connected mode or idle mode) prior to transmitting the SMS message. If UE 115-h is in a connected mode, AMF 120-h may transmit the SMS message to UE 115-h. If UE 115-h is in an idle mode, AMF 120-h may transmit a paging message to UE 115-h triggering a transition of the UE 115-h to a connected mode. AMF 120-h may then transmit the SMS message to UE 115-h based on a response from the UE 115-h to the paging message.

Additionally or alternatively, AMF 120-h may maintain a database including information about the connection status of different UEs. SMSF 805-b may query AMF 120-h for the connection status of UE 115-h (e.g., over the N15 interface), and, if the UE 115-h is in a connected mode, SMSF 805-b may transmit the SMS payload to AMF 120-h at 825. If the UE 115-h is in an idle mode, the AMF 120-h may send an idle mode indication to SMSF 805-b, and the AMF 120-h may store an indication that there is an SMS message for the UE 115-h. Accordingly, if AMF 120-h is replaced by another AMF, the other AMF may be able to identify that there is an SMS message on hold for UE 115-h. AMF 120-h (or the other AMF) may then identify when the UE 115-h transitions from an idle mode to a connected mode and transmit an indication to SMSF 805-*b* that the UE 115-*h* is in a connected mode. Subsequently, SMSF 805-*b* may transmit the SMS payload to AMF 120-*h* for transmission to UE 115-*h*.

Figure 9:
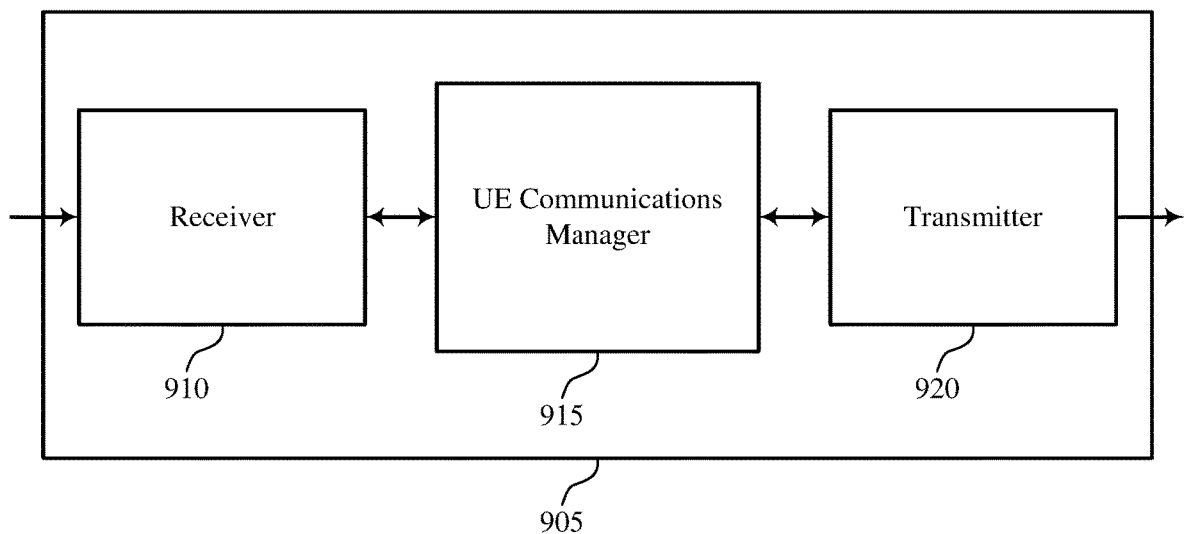
FIGS. 9 through 10 show diagrams of wireless devices that support NAS transport for non-mobility management messages in accordance with one or more aspects of the present disclosure.

FIG. 9 shows a diagram 900 of a wireless device 905 that supports NAS transport for non-mobility management messages in accordance with one or more aspects of the present disclosure. Wireless device 905 may be an example of aspects of a UE 115 as described with reference to FIG. 1. wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to NAS transport for non-mobility management messages). Information may be passed on to other components of the device. The receiver 910 may be an example of aspects of the transceiver 1235 as described with reference to FIG. 12.

UE communications manager 915 may be an example of aspects of the UE communications manager 1215 as described with reference to FIG. 12. UE communications manager 915 and/or at least some of its various sub-components may be implemented in hardware, software executed by a processor, firmware, or any combination thereof. If implemented in software executed by a processor, the functions of UE communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may identify a payload for a transmission to a first core network entity and generate a NAS transport message based on a type of the payload, the NAS transport message including the payload.

Transmitter 920 may transmit signals generated by other components of the device. In some examples, transmitter 920 may be collocated with receiver 910 in a transceiver module. For example, transmitter 920 may be an example of aspects of transceiver 1235 as described with reference to FIG. 12. Transmitter 920 may include a single antenna, or it may include a set of antennas. In some cases, transmitter 920 may transmit the NAS transport message to a second core network entity.

Figure 10:
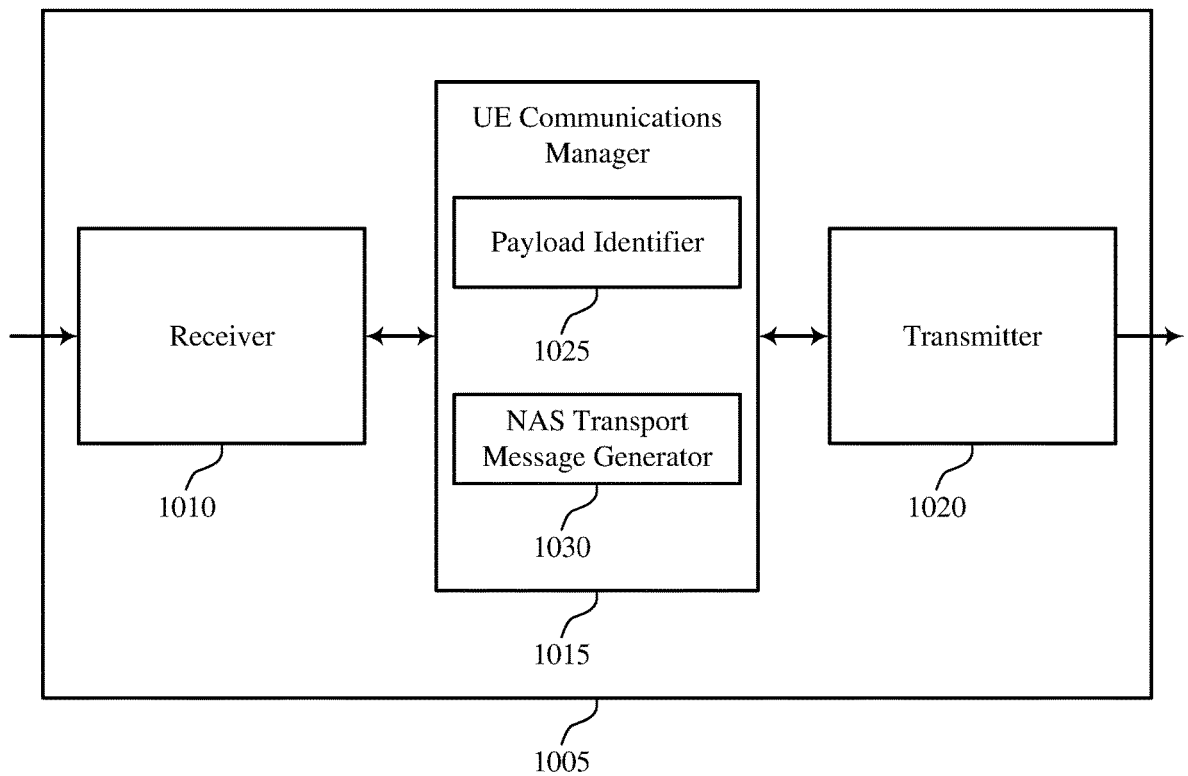

FIG. 10 shows a diagram 1000 of a wireless device 1005 that supports NAS transport for non-mobility management messages in accordance with one or more aspects of the present disclosure. Wireless device 1005 may be an example of aspects of a wireless device 905 or a UE 115 as described with reference to FIGS. 1 and 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, and/or control information associated with various information channels (e.g., control channels, data channels, and information related to NAS transport for non-mobility management messages). Information may be passed on to other components of the device. Receiver 1010 may be an example of aspects of transceiver 1235 as described with reference to FIG. 12.

UE communications manager 1015 may be an example of aspects of the UE communications manager 1215 as described with reference to FIG. 12. UE communications manager 1015 may also include payload identifier 1025 and NAS transport message generator 1030.

Payload identifier 1025 may identify a payload for a transmission to a first core network entity. In some cases, the payload includes a SM payload, a SMS payload, a policy control payload, or a combination thereof. In some cases, the first core network entity includes a session management manager, a short message service manager, a policy control manager, or a combination thereof. NAS transport message generator 1030 may generate a NAS transport message based on a type of the payload, the NAS transport message including the payload. In some cases, the NAS transport message includes a header that indicates the type of the payload, a security key, routing information associated with a core network entity destination, or a combination thereof. In some cases, the NAS transport message includes routing information (e.g., a routing indicator) that identifies a second core network entity to route the payload to. In some cases, the routing information may identify a PDU session. In some cases, the second core network entity includes an access and mobility management manager. In some cases, the NAS transport message includes a MM message. In some cases, the NAS transport message includes a NAS message and a container message including the payload.

Transmitter 1020 may transmit signals generated by other components of the device. In some examples, transmitter 1020 may be collocated with receiver 1010 in a transceiver module. For example, the transmitter 1020 may be an example of aspects of the transceiver 1235 as described with reference to FIG. 12. Transmitter 1020 may include a single antenna, or it may include a set of antennas.

Figure 11:
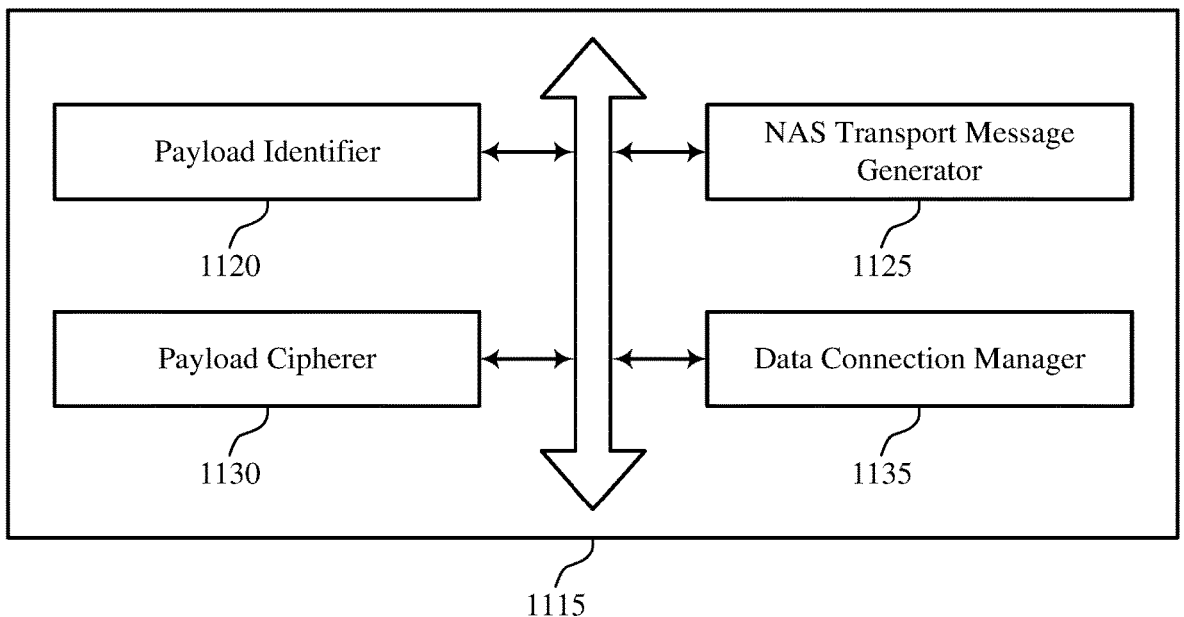
FIG. 11 shows a diagrams of a UE communications manager that support NAS transport for non-mobility management messages in accordance with one or more aspects of the present disclosure.

FIG. 11 shows a diagram 1100 of a UE communications manager 1115 that supports NAS transport for non-mobility management messages in accordance with one or more aspects of the present disclosure. UE communications manager 1115 may be an example of aspects of a UE communications manager 915, a UE communications manager 1015, or a UE communications manager 1215 as described with reference to FIGS. 9, 10, and 12. UE communications manager 1115 may include payload identifier 1120, NAS transport message generator 1125, payload cipherer 1130, and data connection manager 1135. Each of these modules may communicate, directly or indirectly, with one another (e.g., via one or more buses).

Payload identifier 1120 may identify a payload for a transmission to a first core network entity. In some cases, the payload includes a SM payload, a SMS payload, a policy control payload, or a combination thereof. In some cases, the first core network entity includes a session management manager, a short message service manager, a policy control manager, or a combination.

NAS transport message generator 1125 may generate a NAS transport message based on a type of the payload, the NAS transport message including the payload. In some cases, the NAS transport message includes a header that indicates the type of the payload, a security key, routing information associated with a core network entity destination, or a combination thereof. In some cases, the NAS transport message includes routing information (e.g., a routing indicator) that identifies a second core network entity to route the payload to. In some cases, the routing information may identify a PDU session. In some cases, the second core network entity includes an access and mobility management manager. In some cases, the NAS transport message includes a MM message. In some cases, the NAS transport message includes a NAS message and a container message including the payload.

Payload cipherer 1130 may cipher the payload based on a security key associated with the NAS transport message. Data connection manager 1135 may identify the connection status of a UE to a packet data network (PDN). In some cases, the UE may be in a connected mode with the first core network entity without an active data connection with the UE, wherein transmitting the NAS transport message to the second core network entity comprises transmitting the NAS transport message to the second core network entity on an active data connection with the second code network entity.

Figure 12:
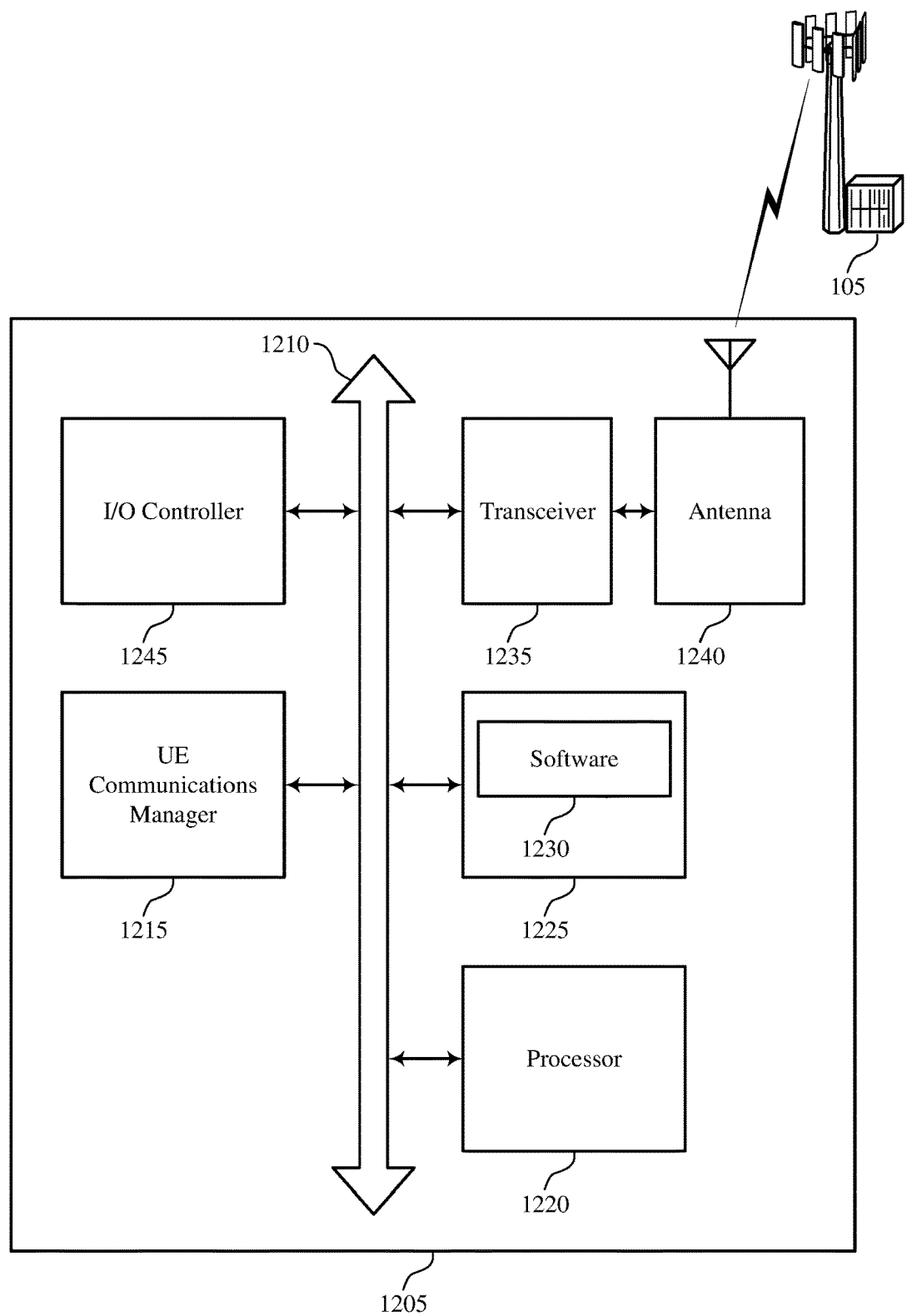
FIG. 12 shows a diagram of a wireless communications system including a device that supports NAS transport for non-mobility management messages in accordance with one or more aspects of the present disclosure.

FIG. 12 shows a diagram of a wireless communications system 1200 including a device 1205 that supports NAS transport for non-mobility management messages in accordance with one or more aspects of the present disclosure. Device 1205 may be an example of or include the components of wireless device 905, wireless device 1005, or a UE 115 as described above, e.g., with reference to FIGS. 1, 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting NAS transport for non-mobility management messages).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support NAS transport for non-mobility management messages. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, transceiver 1235 may represent a wireless transceiver and may communicate bi-directionally with another wireless transceiver. Transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
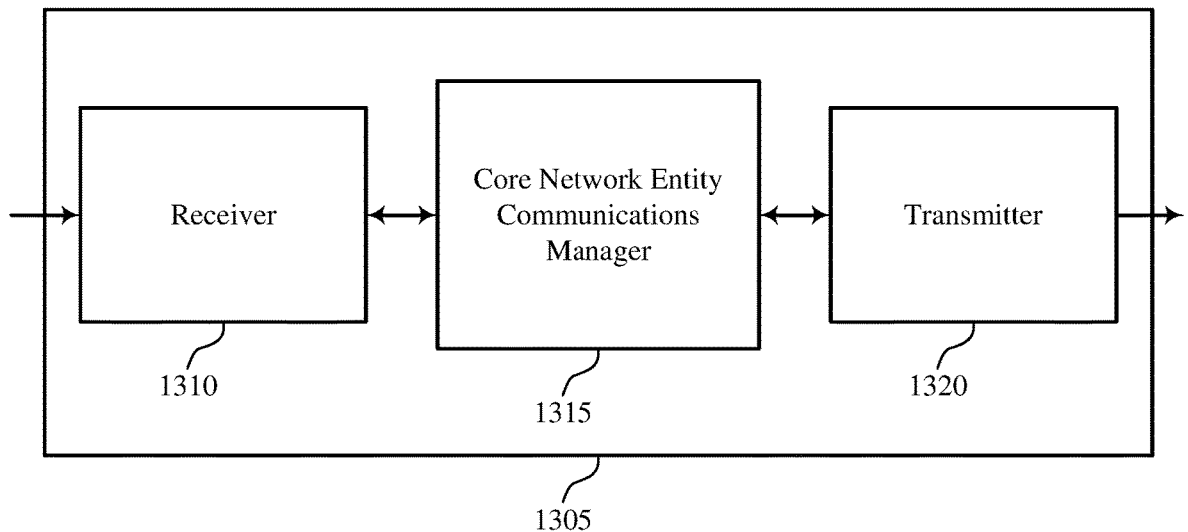
FIGS. 13 through 14 show diagrams of wireless devices that support NAS transport for non-mobility management messages in accordance with one or more aspects of the present disclosure.

FIG. 13 shows a diagram 1300 of a wireless device 1305 that supports NAS transport for non-mobility management messages in accordance with one or more aspects of the present disclosure. Wireless device 1305 may be an example of aspects of a core network 130 as described with reference to FIG. 1. For example, wireless device 1305 may be an example of aspects of an AMF 120 at a core network as described with reference to FIG. 1. Wireless device 1305 may include receiver 1310, core network entity communications manager 1315, and transmitter 1320. wireless device 1305 may also include a processor. Each of these components may be in communication with one another (e.g., via one or more buses).

Receiver 1310 may receive information such as packets, user data, and/or control information associated with various information channels (e.g., control channels, data channels, and information related to NAS transport for non-mobility management messages). Information may be passed on to other components of the device. Receiver 1310 may be an example of aspects of transceiver 1635 as described with reference to FIG. 16.

Receiver 1310 may receive a message including a payload from a second core network entity (e.g., based on an indication that a UE has transitioned to a connected mode). In some cases, the payload includes a SM payload, a SMS payload, a policy control entity payload, or a combination thereof. In some cases, a first core network entity (e.g., wireless device 1305) includes an access and mobility management manager. In some cases, the second core network entity includes a session management manager, a short message service manager, a policy control manager, or a combination thereof.

Core network entity communications manager 1315 may be an example of aspects of core network entity communications manager 1615 as described with reference to FIG. 16. Core network entity communications manager 1315 and/or at least some of its various sub-components may be implemented in hardware, software executed by a processor, firmware, or any combination thereof. If implemented in software executed by a processor, the functions of core network entity communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

Core network entity communications manager 1315 and/or at least some of its various sub-components may be physically located at various positions, including being distributed such that portions of functions are implemented at different physical locations by one or more physical devices. In some examples, core network entity communications manager 1315 and/or at least some of its various sub-components may be a separate and distinct component in accordance with various aspects of the present disclosure. In other examples, core network entity communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Core network entity communications manager 1315 may receive a NAS transport message including a payload from a UE, identify a type of the payload in the NAS transport message received from the UE, and initiate an action by the first core network entity based on identifying the type of the payload. Core network entity communications manager 1315 may also generate a NAS transport message based on a type of the payload, the NAS transport message including the payload.

Transmitter 1320 may transmit signals generated by other components of the device. In some examples, transmitter 1320 may be collocated with receiver 1310 in a transceiver module. For example, transmitter 1320 may be an example of aspects of transceiver 1635 as described with reference to FIG. 16. Transmitter 1320 may include a single antenna, or it may include a set of antennas.

Transmitter 1320 may transmit a second portion of the NAS transport message to a second core network entity based on the type of the payload, transmit a message to the UE acknowledging receipt of the NAS transport message, transmit the NAS transport message to a UE, transmit the NAS transport message to the UE based on a response from the UE to the paging message, and transmit, to the second core network entity, an indication that the UE is in the connected mode. In some cases, initiating an action by the first core network entity includes transmitting content of the NAS transport message to a second core network entity based on the type of the payload. In some cases, initiating an action by the first core network entity includes transmitting content of the NAS transport message to the second core network entity based on the routing information. In some cases, the second core network entity includes a session management manager, a short message service manager, a policy control manager, or a combination thereof.

Figure 14:
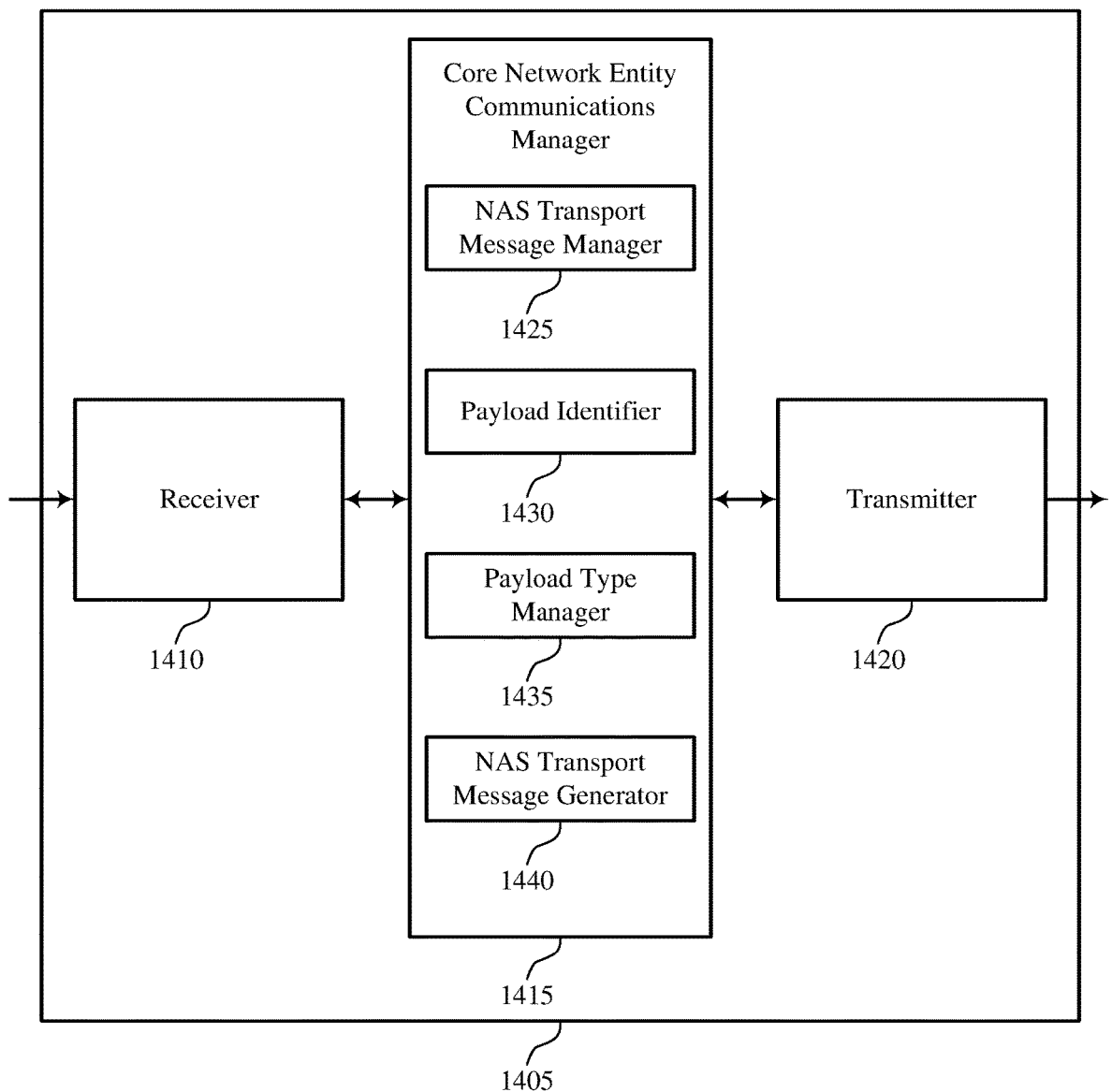

FIG. 14 shows a diagram 1400 of a wireless device 1405 that supports NAS transport for non-mobility management messages in accordance with one or more aspects of the present disclosure. Wireless device 1405 may be an example of aspects of a wireless device 1305 or an entity of a core network 130 as described with reference to FIGS. 1 and 13. For example, wireless device 1405 may be an example of aspects of an AMF 120 as described with reference to FIGS. 1 and 13. Wireless device 1405 may include receiver 1410, core network entity communications manager 1415, and transmitter 1420. wireless device 1405 may also include a processor. Each of these components may be in communication with one another (e.g., via one or more buses).

Receiver 1410 may receive information such as packets, user data, and/or control information associated with various information channels (e.g., control channels, data channels, and information related to NAS transport for non-mobility management messages). Information may be passed on to other components of the device. Receiver 1410 may be an example of aspects of transceiver 1635 as described with reference to FIG. 16.

Core network entity communications manager 1415 may be an example of aspects of the core network entity communications manager 1615 as described with reference to FIG. 16. Core network entity communications manager 1415 may also include NAS transport message manager 1425, payload identifier 1430, payload type manager 1435, and NAS transport message generator 1440.

NAS transport message manager 1425 may receive a NAS transport message including a payload from a UE and determine that the received NAS transport message is an initial NAS transport message received from the UE. In some cases, the NAS transport message includes a header that indicates the type of the payload, a security key, routing information associated with a core network entity destination, or a combination thereof. In some cases, the NAS transport message includes routing information (e.g., a routing indicator) that identifies a second core network entity to route the payload to. In some cases, the routing information may identify a PDU session. In some cases, the NAS transport message includes a MM message. In some cases, the NAS transport message includes a NAS message and a container message including the payload. In some cases, the first core network entity includes an access and mobility management manager.

Payload identifier 1430 may identify a type of the payload in the NAS transport message received from the UE. Payload type manager 1435 may initiate an action by the first core network entity based on identifying the type of the payload. In some cases, the payload includes a SM payload, a SMS payload, a policy control payload, or a combination thereof.

NAS transport message generator 1440 may generate a NAS transport message based on a type of the payload, the NAS transport message including the payload. In some cases, the NAS transport message includes a header that indicates the type of the payload, a security key, routing information associated with a core network entity destination, or a combination thereof. In some cases, the NAS transport message includes a MM message. In some cases, the NAS transport message includes a NAS message and a container message including the payload.

Transmitter 1420 may transmit signals generated by other components of the device. In some examples, transmitter 1420 may be collocated with receiver 1410 in a transceiver module. For example, transmitter 1420 may be an example of aspects of transceiver 1635 as described with reference to FIG. 16. Transmitter 1420 may include a single antenna, or it may include a set of antennas.

Figure 15:
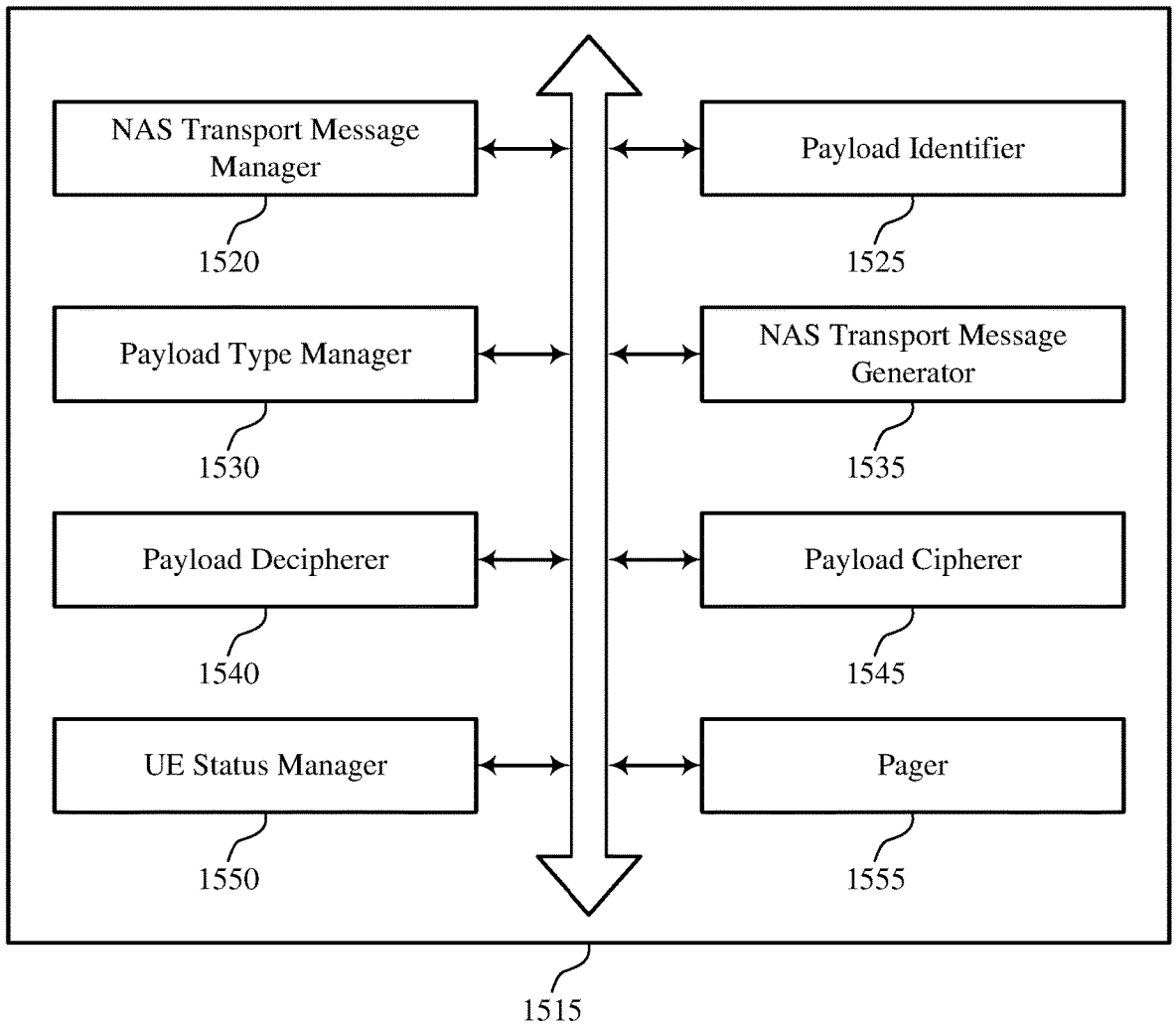
FIG. 15 shows diagrams of a core network entity communications manager that support NAS transport for non-mobility management messages in accordance with one or more aspects of the present disclosure.

FIG. 15 shows a diagram 1500 of a core network entity communications manager 1515 that supports NAS transport for non-mobility management messages in accordance with one or more aspects of the present disclosure. The core network entity communications manager 1515 may be an example of aspects of a core network entity communications manager 1615 as described with reference to FIGS. 13, 14, and 16. The core network entity communications manager 1515 may include NAS transport message manager 1520, payload identifier 1525, payload type manager 1530, NAS transport message generator 1535, payload decipherer 1540, payload cipherer 1545, UE status manager 1550, and pager 1555. Each of these modules may communicate, directly or indirectly, with one another (e.g., via one or more buses).

NAS transport message manager 1520 may receive a NAS transport message including a payload from a UE and determine that the received NAS transport message is an initial NAS transport message received from the UE. In some cases, the NAS transport message includes a header that indicates the type of the payload, a security key, routing information associated with a core network entity destination, or a combination thereof. In some cases, the NAS transport message includes routing information (e.g., a routing indicator) that identifies a second core network entity to route the payload to. In some cases, the routing information may identify a PDU session. In some cases, the NAS transport message includes a MM message. In some cases, the NAS transport message includes a NAS message and a container message including the payload. In some cases, the first core network entity includes an access and mobility management manager.

Payload identifier 1525 may identify a type of the payload in the NAS transport message received from the UE. Payload type manager 1530 may initiate an action by the first core network entity based on identifying the type of the payload. In some cases, the payload includes a SM payload, a SMS payload, a policy control payload, or a combination thereof.

NAS transport message generator 1535 may generate a NAS transport message based on a type of the payload, the NAS transport message including the payload. In some cases, the NAS transport message includes a header that indicates the type of the payload, a security key, routing information associated with a core network entity destination, or a combination thereof. In some cases, the NAS transport message includes a MM message. In some cases, the NAS transport message includes a NAS message and a container message including the payload.

Payload decipherer 1540 may decipher the payload based on a security key associated with the NAS transport message. In some cases, initiating an action by the first core network entity includes: deciphering a first portion of the NAS transport message based on a security key associated with the NAS transport message. Payload cipherer 1545 may cipher the payload based on a security key associated with the NAS transport message.

UE status manager 1550 may determine that the UE is in a connected mode, where transmitting the NAS transport message to the UE is based on the determination, determine that the UE is in an idle mode, and identify a transition of the UE from an idle mode to a connected mode. Pager 1555 may transmit a paging message to the UE triggering a transition of the UE to a connected mode.

Figure 16:
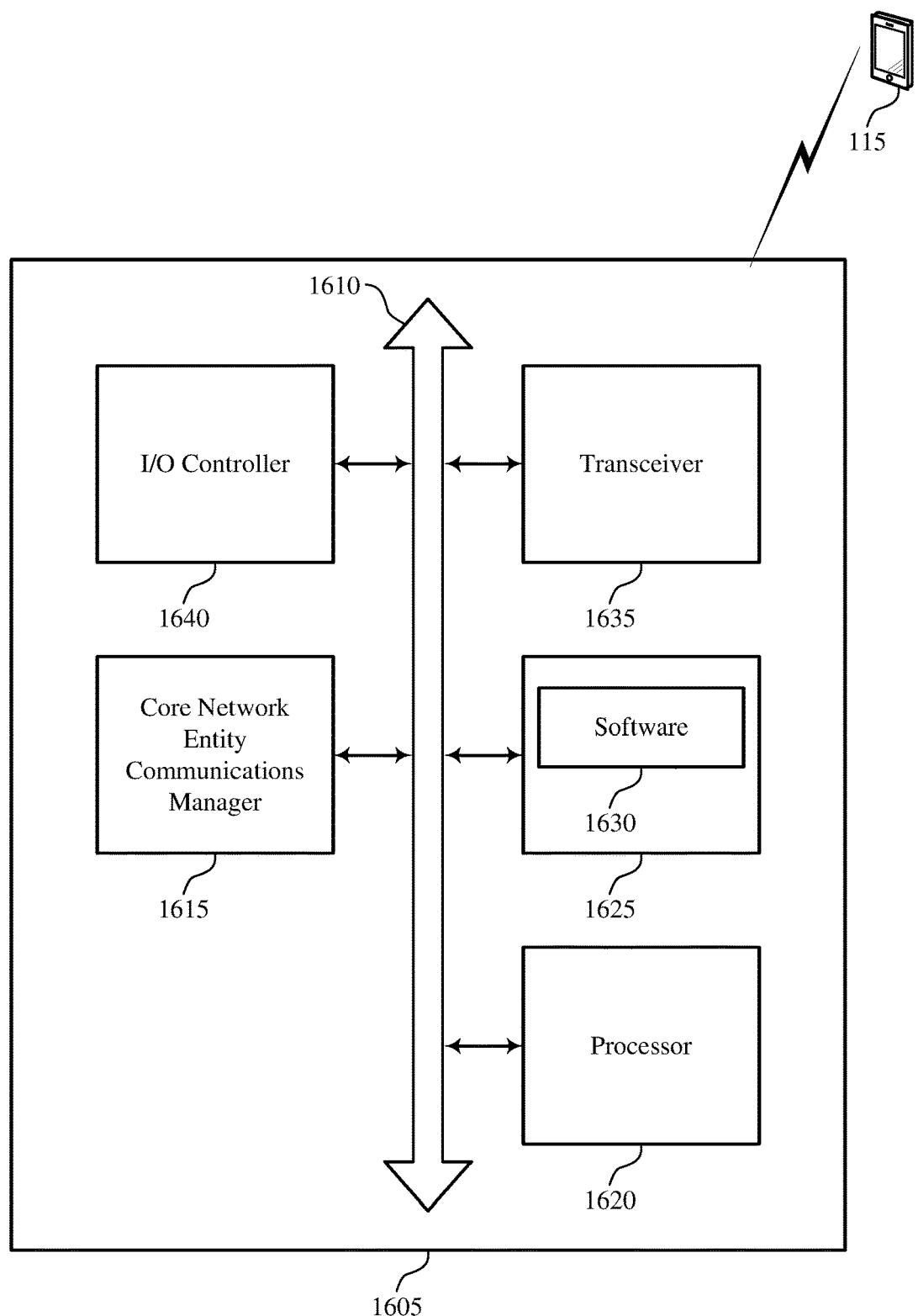
FIG. 16 shows a diagram of a wireless communications system including a device that supports NAS transport for non-mobility management messages in accordance with one or more aspects of the present disclosure.

FIG. 16 shows a diagram of a wireless communications system 1600 including a device 1605 that supports NAS transport for non-mobility management messages in accordance with one or more aspects of the present disclosure. Device 1605 may be an example of or include the components of core network entity (e.g., AMF 120) as described above, e.g., with reference to FIG. 1. Device 1605 may include components for bi-directional voice and data communications including components for transmitting and receiving communications, including core network entity communications manager 1615, processor 1620, memory 1625, software 1630, transceiver 1635, and I/O controller 1640. These components may be in electronic communication via one or more busses (e.g., bus 1610).

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting NAS transport for non-mobility management messages).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware and/or software operation such as the interaction with peripheral components or devices.

Software 1630 may include code to implement aspects of the present disclosure, including code to support NAS transport for non-mobility management messages. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

I/O controller 1640 may manage input and output signals for device 1605. I/O controller 1640 may also manage peripherals not integrated into device 1605. In some cases, I/O controller 1640 may represent a physical connection or port to an external peripheral. In some cases, I/O controller 1640 may utilize an operating system such as iOS®, ANDROID®, MS-DOS®, MS-WINDOWS®, OS/2®, UNIX®, LINUX®, or another known operating system. In other cases, I/O controller 1640 may represent or interact with a modem, a keyboard, a mouse, a touchscreen, or a similar device. In some cases, I/O controller 1640 may be implemented as part of a processor. In some cases, a user may interact with device 1605 via I/O controller 1640 or via hardware components controlled by I/O controller 1640.

Figure 17:
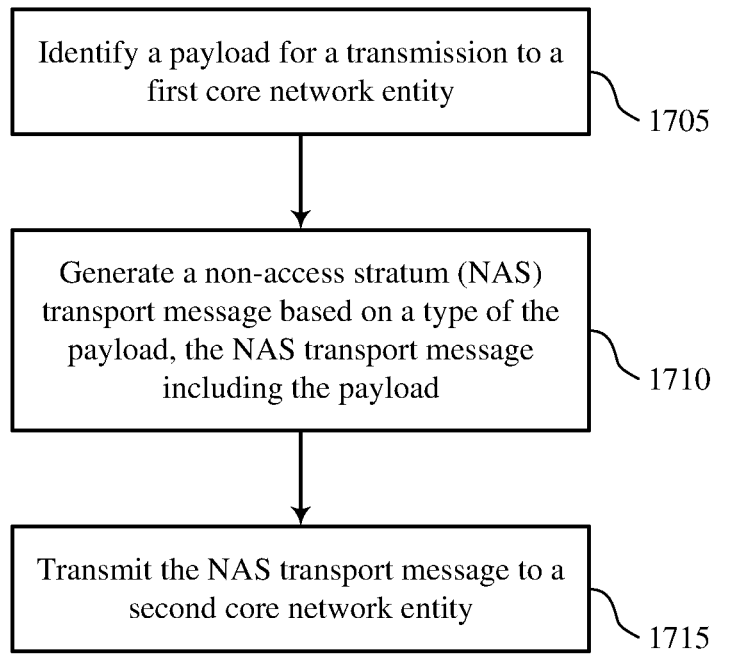
FIGS. 17 through 19 show flowcharts illustrate methods for NAS transport for non-mobility management messages in accordance with one or more aspects of the present disclosure.

FIG. 17 shows a flowchart illustrating a method 1700 for NAS transport for non-mobility management messages in accordance with one or more aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1705, the UE 115 may identify a payload for a transmission to a first core network entity. The operations of 1705 may be performed according to the methods as described with reference to FIGS. 1 through 8. In certain examples, aspects of the operations of 1705 may be performed by a payload identifier as described with reference to FIGS. 9 through 12.

At 1710, the UE 115 may generate a NAS transport message based at least in part on a type of the payload, the NAS transport message including the payload. The operations of 1710 may be performed according to the methods as described with reference to FIGS. 1 through 8. In certain examples, aspects of the operations of 1710 may be performed by a NAS transport message generator as described with reference to FIGS. 9 through 12.

At 1715, the UE 115 may transmit the NAS transport message to a second core network entity. The operations of 1715 may be performed according to the methods as described with reference to FIGS. 1 through 8. In certain examples, aspects of the operations of 1715 may be performed by a transmitter as described with reference to FIGS. 9 through 12.

Figure 18:
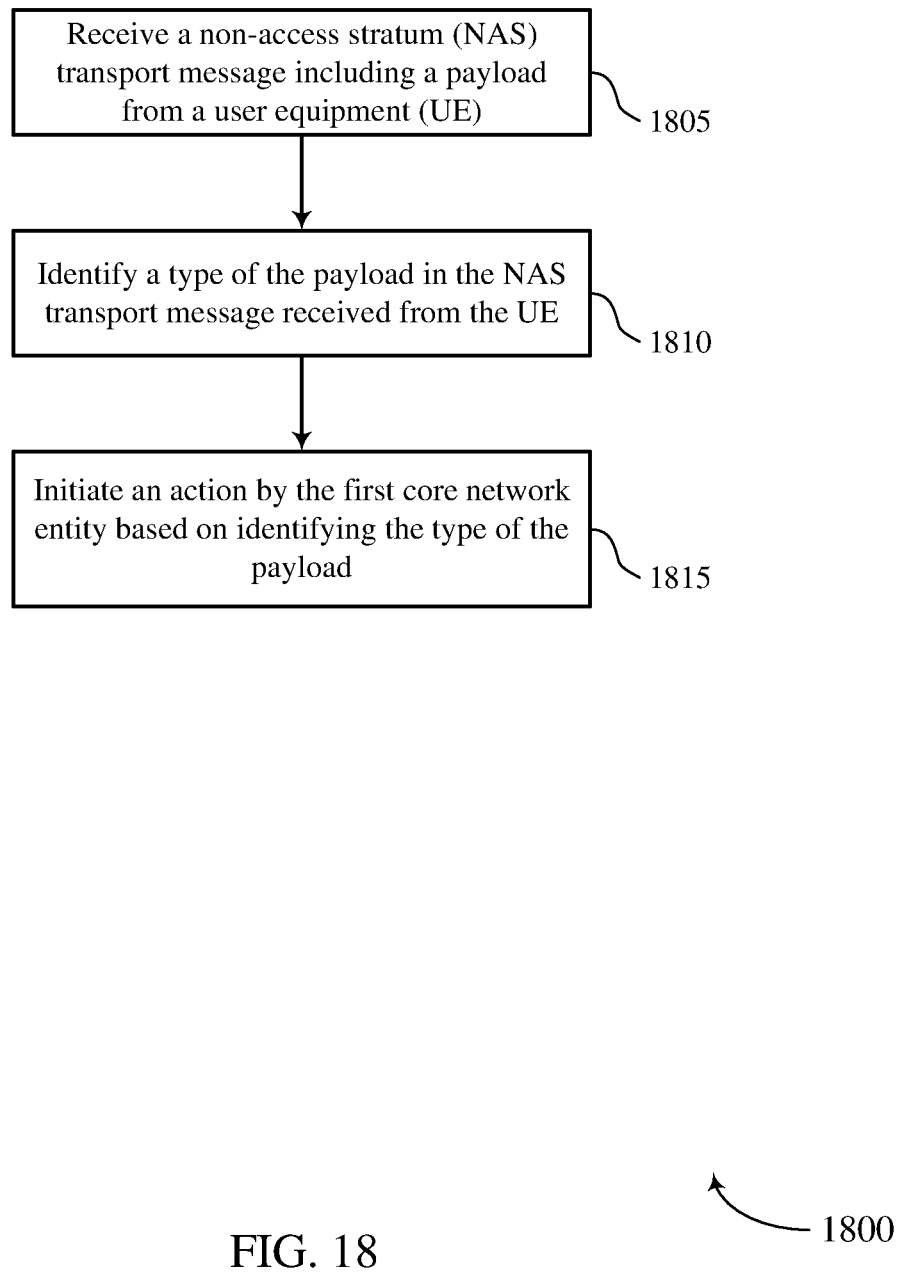

FIG. 18 shows a flowchart illustrating a method 1800 for NAS transport for non-mobility management messages in accordance with one or more aspects of the present disclosure. The operations of method 1800 may be implemented by a core network entity (e.g., AMF 120) or its components as described herein. For example, the operations of method 1800 may be performed by a core network entity communications manager as described with reference to FIGS. 13 through 16. In some examples, a core network entity may execute a set of codes to control the functional elements of the device to perform the functions described below. Additionally or alternatively, the core network entity may perform aspects of the functions described below using special-purpose hardware.

At 1805, the core network entity may receive a NAS transport message comprising a payload from a UE. The operations of 1805 may be performed according to the methods as described with reference to FIGS. 1 through 8. In certain examples, aspects of the operations of 1805 may be performed by a NAS transport message manager as described with reference to FIGS. 13 through 16.

At 1810, the core network entity may identify a type of the payload in the NAS transport message received from the UE. The operations of 1810 may be performed according to the methods as described with reference to FIGS. 1 through 8. In certain examples, aspects of the operations of 1810 may be performed by a payload identifier as described with reference to FIGS. 13 through 16.

At 1815, the core network entity may initiate an action by the first core network entity based at least in part on identifying the type of the payload. The operations of 1815 may be performed according to the methods as described with reference to FIGS. 1 through 8. In certain examples, aspects of the operations of 1815 may be performed by a payload type manager as described with reference to FIGS. 13 through 16.

Figure 19:
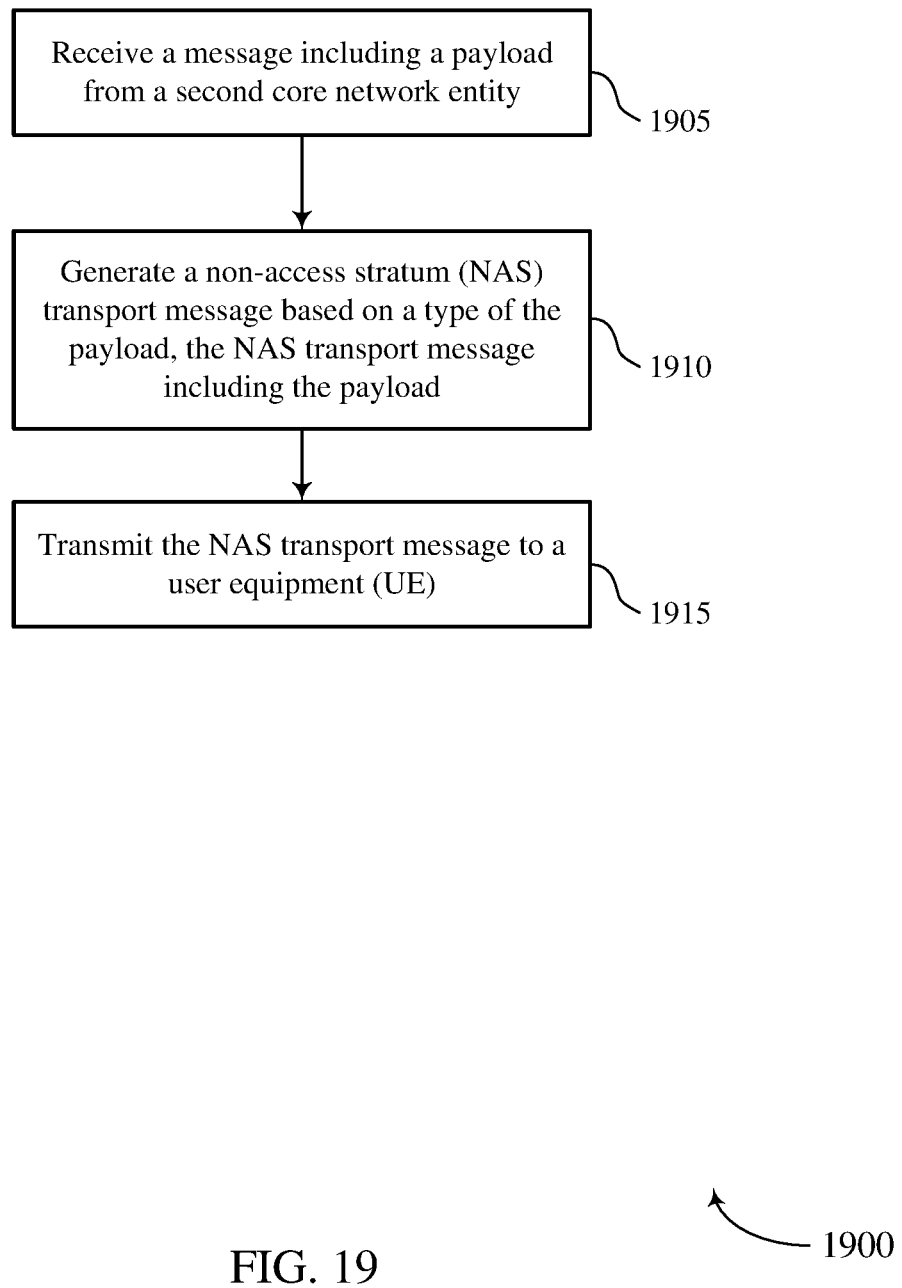

FIG. 19 shows a flowchart illustrating a method 1900 for NAS transport for non-mobility management messages in accordance with one or more aspects of the present disclosure. The operations of method 1900 may be implemented by a core network entity (e.g., AMF 120) or its components as described herein. For example, the operations of method 1900 may be performed by a core network entity communications manager as described with reference to FIGS. 13 through 16. In some examples, a core network entity may execute a set of codes to control the functional elements of the device to perform the functions described below. Additionally or alternatively, the core network entity may perform aspects of the functions described below using special-purpose hardware.

At 1905, the core network entity may receive a message comprising a payload from a second core network entity. The operations of 1905 may be performed according to the methods as described with reference to FIGS. 1 through 8. In certain examples, aspects of the operations of 1905 may be performed by a receiver as described with reference to FIGS. 13 through 16.

At 1910 the core network entity may generate a NAS transport message based at least in part on a type of the payload, the NAS transport message comprising the payload. The operations of 1910 may be performed according to the methods described with reference to FIGS. 1 through 8. In certain examples, aspects of the operations of 1910 may be performed by a NAS transport message generator as described with reference to FIGS. 13 through 16.

At 1915 the core network entity may transmit the NAS transport message to a UE. The operations of 1915 may be performed according to the methods as described with reference to FIGS. 1 through 8. In certain examples, aspects of the operations of 1915 may be performed by a transmitter as described with reference to FIGS. 13 through 16.

It should be noted that the methods described above describe possible implementations, and that the operations may be rearranged or otherwise modified and that other implementations are possible.

In some examples, aspects from two or more of the methods may be combined. It should be noted that the methods are just example implementations, and that the operations of the methods may be rearranged or otherwise modified such that other implementations are possible.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNB s provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector) of a carrier or base station, depending on context.

Base stations may include or may be referred to by those skilled in the art as a base transceiver station, a radio base station, an access point, a radio transceiver, a NodeB, eNB, next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNB s, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications system architecture 200 as described with references to FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A non-transitory computer-readable medium storing code for wireless communication, the code comprising instructions executable by a processor to:
   identify a policy control payload for a transmission from a user equipment to a first core network entity;
   generate a non-access stratum (NAS) transport message based at least in part on a type of content of the payload comprising policy control, the NAS transport message comprising:
      the policy control payload for the transmission from the user equipment to the first core network entity; and
      an indication that the type of content of the payload comprises policy control; and
   transmit the NAS transport message from the user equipment to a second core network entity, the second core network entity configured to route at least the policy control payload of the NAS transport message to the first core network entity based at least in part on the indication that the type of content of the payload comprises policy control.

2. The non-transitory computer-readable medium of claim 1, wherein transmitting the NAS transport message from the user equipment to a second core network entity, comprises:
   transmitting the NAS transport message from the user equipment to an access and mobility management function (AMF), the AMF configured to route at least the policy control payload of the NAS transport message to a policy control function (PCF) based at least in part on the indication that the type of content of the payload comprises policy control.

3. A non-transitory computer-readable medium storing code for wireless communication, the code comprising instructions executable by a processor to:
   identify a session management payload for a transmission from the user equipment to a first core network entity;
   generate a non-access stratum (NAS) transport message based at least in part on a type of content of the payload comprising session management, the NAS transport message comprising:
      the session management payload for the transmission from the user equipment to the first core network entity; and
      an indication that the type of content of the payload comprises session management; and
   transmit the NAS transport message from the user equipment to a second core network entity, the second core network entity configured to route at least the session management payload of the NAS transport message to the first core network entity based at least in part on the indication that the type of content of the payload comprises session management.

4. The non-transitory computer-readable medium of claim 3, wherein transmitting the NAS transport message from the user equipment to a second core network entity, comprises:
   transmitting the NAS transport message from the user equipment to an access and mobility management function (AMF), the AMF configured to route at least the session management payload of the NAS transport message to a session management function (SMF) based at least in part on the indication that the type of content of the payload comprises session management.

5. A method for wireless communication at an access and mobility management function (AMF), the method comprising:
by the access and mobility management function:
receiving, from a user equipment, a non-access stratum (NAS) transport message comprising:
a payload; and
a payload type indication that indicates the payload comprises a session management payload; and
routing at least the session management payload to a session management function (SMF) based at least in part on the payload type indication that indicates the payload comprises the session management payload.

6. An apparatus for wireless communications, comprising:
a processor;
memory coupled with the processor; and
the processor and memory configured to:
receive, by an access and mobility management function (AMF) and from a user equipment, a non-access stratum (NAS) transport message comprising:
a payload; and
a payload type indication that indicates the payload comprises a session management payload; and
route, by the access and mobility management function, at least the session management payload to a session management function (SMF) based at least in part on the payload type indication that indicates the payload comprises the session management payload.

7. A non-transitory computer-readable medium storing code for wireless communication, the code comprising instructions executable by a processor to:
receive, by an access and mobility management function (AMF) and from a user equipment, a non-access stratum (NAS) transport message comprising:
a payload; and
a payload type indication that indicates the payload comprises a session management payload; and
route, by the access and mobility management function, at least the session management payload to a session management function (SMF) based at least in part on the payload type indication that indicates the payload comprises the session management payload.

8. A method for wireless communication at an access and mobility management function (AMF), the method comprising:
by the access and mobility management function:
receiving, from a user equipment, a non-access stratum (NAS) transport message comprising:
a payload; and
a payload type indication that indicates the payload comprises a policy payload; and
routing at least the policy payload to a policy control function (PCF) based at least in part on the payload type indication that indicates the payload comprises the policy payload.

9. An apparatus for wireless communications, comprising:
a processor;
memory coupled with the processor; and
the processor and memory configured to:
receive, by an access and mobility management function (AMF) and from a user equipment, a non-access stratum (NAS) transport message comprising:
a payload; and
a payload type indication that indicates the payload comprises a policy payload; and
route, by the access and mobility management function, at least the policy payload to a policy control function (PCF) based at least in part on the payload type indication that indicates the payload comprises the policy payload.

10. A non-transitory computer-readable medium storing code for wireless communication, the code comprising instructions executable by a processor to:
receive, by an access and mobility management function (AMF) and from a user equipment, a non-access stratum (NAS) transport message comprising:
a payload; and
a payload type indication that indicates the payload comprises a policy payload; and
route, by the access and mobility management function, at least the policy payload to a policy control function (PCF) based at least in part on the payload type indication that indicates the payload comprises the policy payload.

11. A method for wireless communication, comprising:
by a user equipment:
generating a non-access stratum (NAS) transport message comprising:
a payload; and
a payload type indication that indicates the payload comprises a policy payload; and
transmitting, to an access and mobility management function (AMF), the generated NAS transport message that comprises the payload and the payload type indication that indicates the payload comprises the policy payload;
the AMF configured to route at least the policy payload to a policy control function (PCF) based at least in part on the payload type indication that indicates the payload comprises the policy payload.

12. An apparatus for wireless communication, comprising:
a processor;
memory coupled with the processor; and
the processor and memory configured to:
generate a non-access stratum (NAS) transport message comprising:
a payload; and
a payload type indication that indicates the payload comprises a policy payload; and
transmit, to an access and mobility management function (AMF), the generated NAS transport message that comprises the payload and the payload type indication that indicates the payload comprises the policy payload;
the AMF configured to route at least the policy payload to a policy control function (PCF) based at least in part on the payload type indication that indicates the payload comprises the policy payload.

13. A non-transitory computer-readable medium storing code for wireless communication, the code comprising instructions executable by a processor to:
generate a non-access stratum (NAS) transport message comprising:

a payload; and
a payload type indication that indicates the payload comprises a policy payload; and
transmit, to an access and mobility management function (AMF), the generated NAS transport message that comprises the payload and the payload type indication that indicates the payload comprises the policy payload;
the AMF configured to route at least the policy payload to a policy control function (PCF) based at least in part on the payload type indication that indicates the payload comprises the policy payload.

* * * * *